United States Patent [19]

Fujita et al.

[11] Patent Number: 6,035,980

[45] Date of Patent: Mar. 14, 2000

[54] MAGNETIC SPRING HAVING DAMPING CHARACTERISTICS AND VIBRATION MECHANISM HAVING SAME

[75] Inventors: Etsunori Fujita, Hatsukaichi; Yoshimi Enoki, Aki-gun; Hiroshi Nakahira, Hiroshima; Seiji Kawasaki, Higashihiroshima; Hiroki Honda; Yumi Ogura, both of Hiroshima, all of Japan

[73] Assignee: Delta Tooling Co., Ltd., Hiroshima, Japan

[21] Appl. No.: 08/973,929

[22] PCT Filed: Apr. 8, 1997

[86] PCT No.: PCT/JP97/01196

§ 371 Date: Dec. 8, 1997

§ 102(e) Date: Dec. 8, 1997

[87] PCT Pub. No.: WO97/38242

PCT Pub. Date: Oct. 16, 1997

[30] Foreign Application Priority Data

Apr. 8, 1996 [JP] Japan ................................. 8-085125

[51] Int. Cl.[7] .................................. B60N 2/50; F16F 6/00; F16F 15/03
[52] U.S. Cl. ..................... 188/267; 267/182; 267/136; 267/140.15; 188/378
[58] Field of Search ........................... 188/267, 378–380, 188/266.7; 267/136, 140.15, 131, 132, 182; 280/5.514; 310/90.5, 26, 92, 51; 318/128, 649; 701/49; 367/156; 296/63; 248/550; 297/217.1, 217.3, 217.7, 311; 192/84.3, 84.31, 21.5; 52/167.1, 167.3, 126.6, 126.5

[56] References Cited

U.S. PATENT DOCUMENTS

| 3,088,062 | 4/1963 | Hudimac ................................. 188/267 |
| 3,609,425 | 9/1971 | Sheridan . |
| 3,638,963 | 2/1972 | Van Leeuwen . |
| 3,770,290 | 11/1973 | Bottalico ................................. 188/267 |
| 3,842,753 | 10/1974 | Theodore et al. ....................... 267/182 |
| 3,941,402 | 3/1976 | Yankowski et al. ..................... 267/182 |
| 3,952,979 | 4/1976 | Hansen . |
| 4,189,699 | 2/1980 | Burke, Jr. . |
| 4,300,067 | 11/1981 | Schumann . |
| 4,432,441 | 2/1984 | Kurokawa ............................... 188/267 |
| 4,498,038 | 2/1985 | Malueg . |
| 4,502,652 | 3/1985 | Breitbach ................................ 188/267 |
| 4,583,752 | 4/1986 | Breitbach . |

(List continued on next page.)

FOREIGN PATENT DOCUMENTS

| 0 393 492 | 10/1990 | European Pat. Off. . |
| 31 17 377 | 12/1982 | Germany . |
| 36 01 182 | 7/1987 | Germany . |
| 58-89077 | 5/1983 | Japan . |
| 61-231871 | 3/1985 | Japan . |
| 63149446 | 6/1988 | Japan . |
| 1-16252 | 1/1989 | Japan . |
| 4-34246 | 2/1992 | Japan . |
| 7-217687 | 8/1995 | Japan . |
| 2 006 958 | 5/1979 | United Kingdom . |
| 2222915 | 3/1990 | United Kingdom . |
| 2 296 068 | 6/1996 | United Kingdom . |

Primary Examiner—Douglas C. Butler
Attorney, Agent, or Firm—Wenderoth, Lind & Ponack, L.L.P.

[57] ABSTRACT

A magnetic spring has at least two permanent magnets (2 and 4) spaced from each other in a kinetic mechanism. At the time of input and at the time of output, the geometric dimensions between the two permanent magnets are changed by the kinetic mechanism or an external force. The change in geometric dimensions is converted into a repulsive force in the kinetic mechanism, thereby (1) making the repulsive force from a balanced position of the two permanent magnets greater at the time of output than at the time of input, or (2) deriving a damping term of the magnetic spring to provide nonlinear damping and spring characteristics.

7 Claims, 39 Drawing Sheets

U.S. PATENT DOCUMENTS

| | | |
|---|---|---|
| 4,595,166 | 6/1986 | Kurokawa . |
| 4,605,194 | 8/1986 | Binnig et al. . |
| 4,664,352 | 5/1987 | Shibuki et al. . |
| 4,710,656 | 12/1987 | Studer ................................. 188/267 |
| 4,802,660 | 2/1989 | Engdahl ............................... 267/182 |
| 4,913,482 | 4/1990 | Hanai et al. . |
| 4,950,931 | 8/1990 | Goldenberg et al. . |
| 4,969,624 | 11/1990 | Ustelentsev et al. . |
| 5,017,819 | 5/1991 | Patt et al. ............................. 310/90.5 |
| 5,120,030 | 6/1992 | Lin et al. ................................ 188/267 |
| 5,231,336 | 7/1993 | Van Namen . |
| 5,415,140 | 5/1995 | Rigazzi . |
| 5,419,528 | 5/1995 | Carter et al. . |
| 5,467,720 | 11/1995 | Korenaga et al. . |
| 5,487,533 | 1/1996 | Kurita et al. ........................... 188/267 |
| 5,584,367 | 12/1996 | Berdut ................................... 188/267 |
| 5,587,615 | 12/1996 | Murray et al. . |
| 5,633,547 | 5/1997 | Coombs . |

ATTRACTION

REPULSION

REPULSION

Fig.5
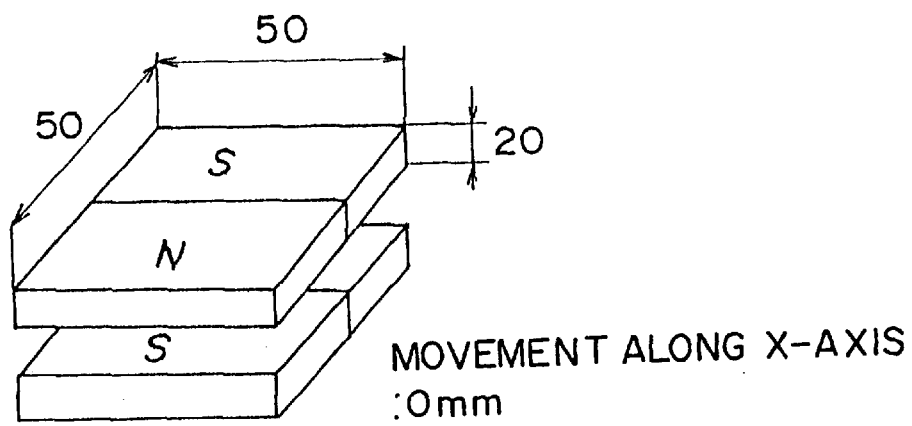
MOVEMENT ALONG X-AXIS
:0mm
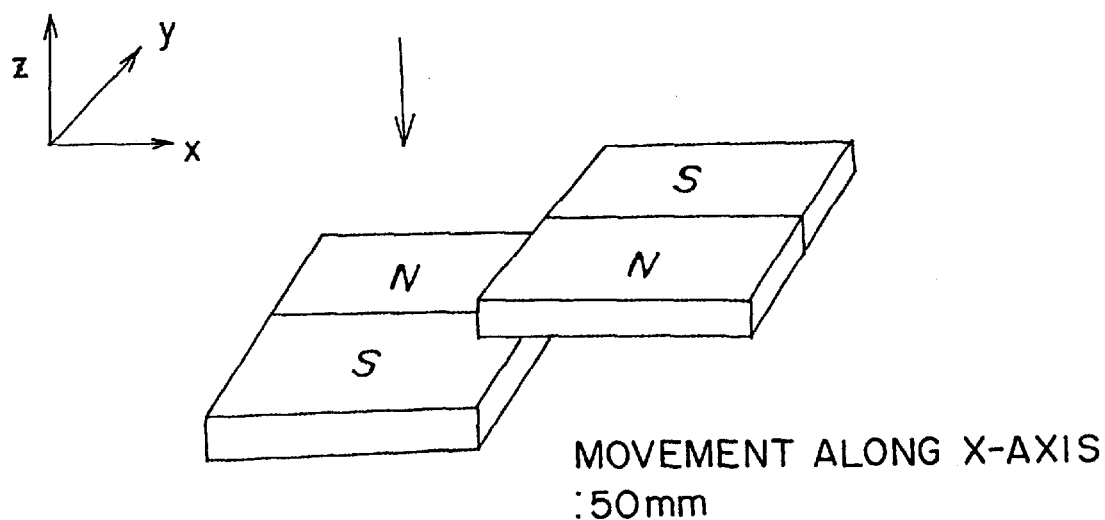
MOVEMENT ALONG X-AXIS
:50mm Fig.8
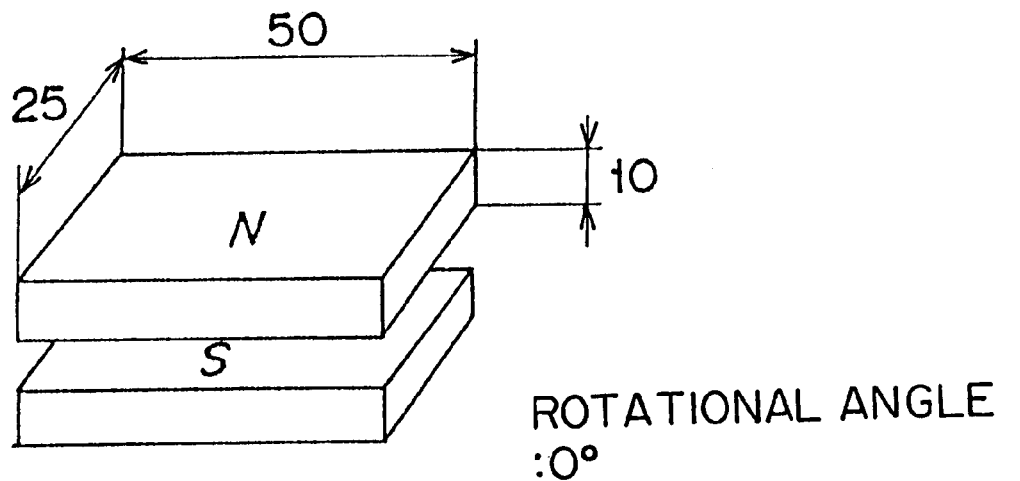
ROTATIONAL ANGLE :0°
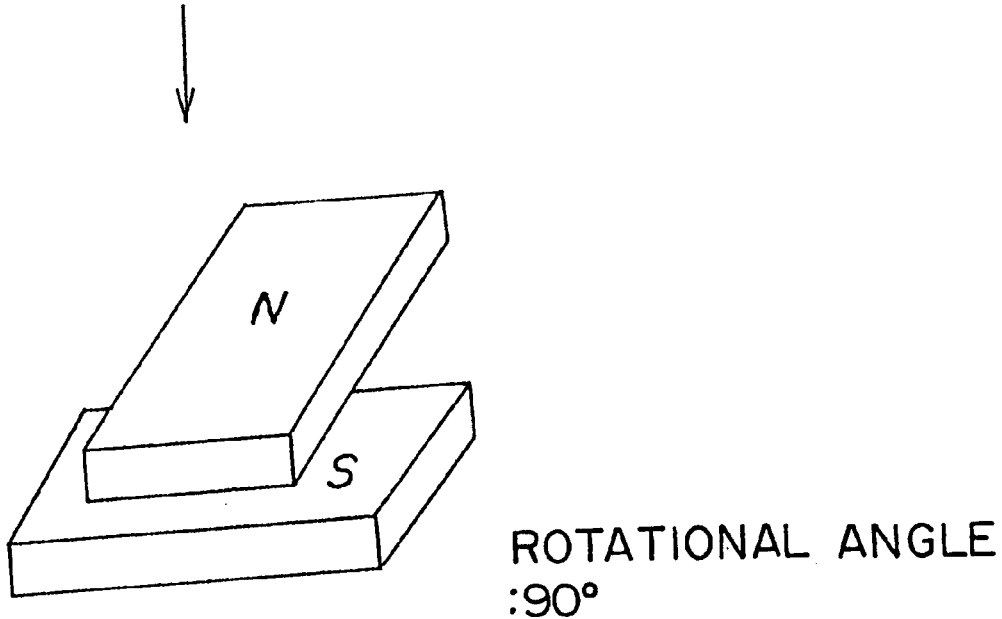
ROTATIONAL ANGLE :90°

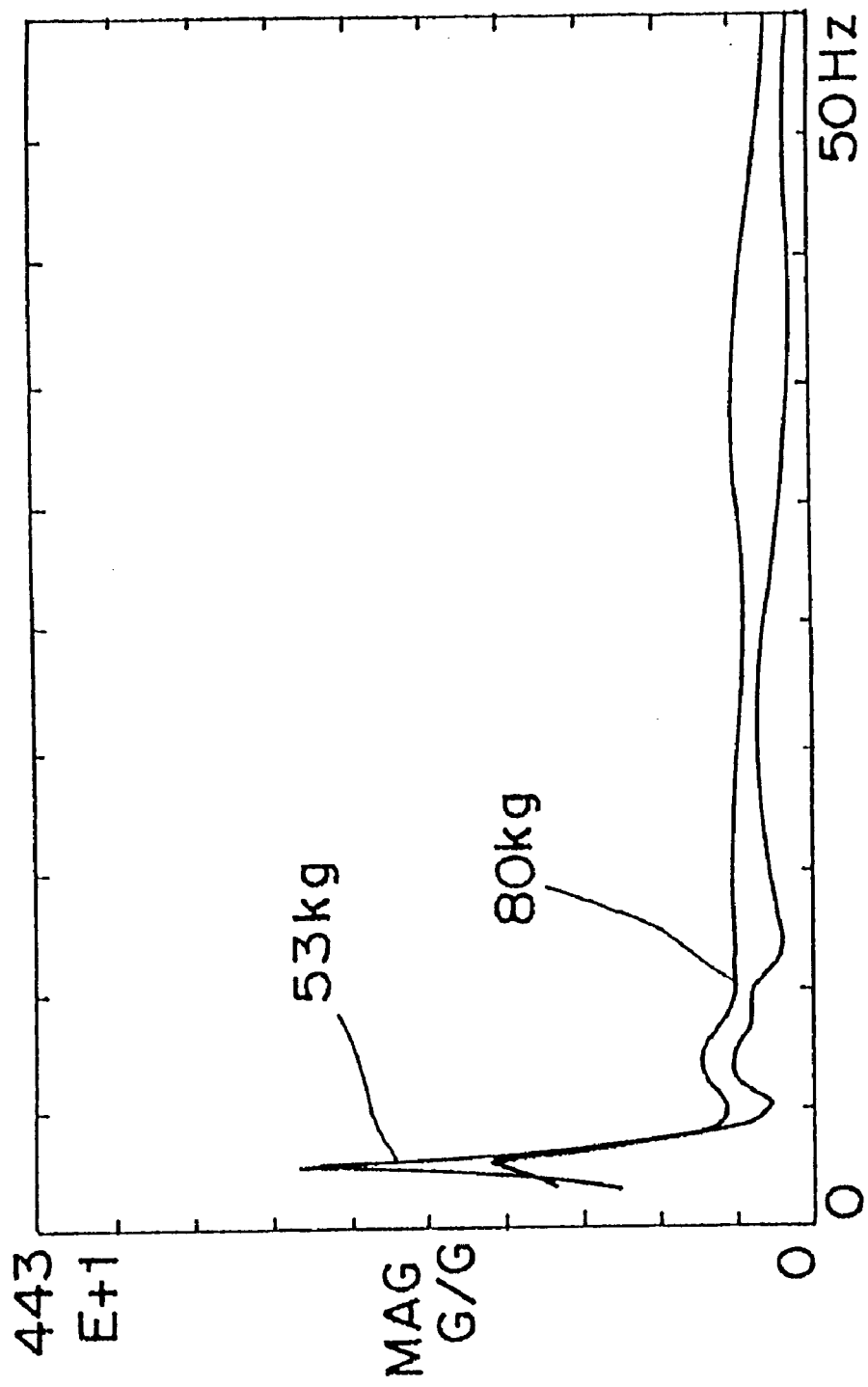

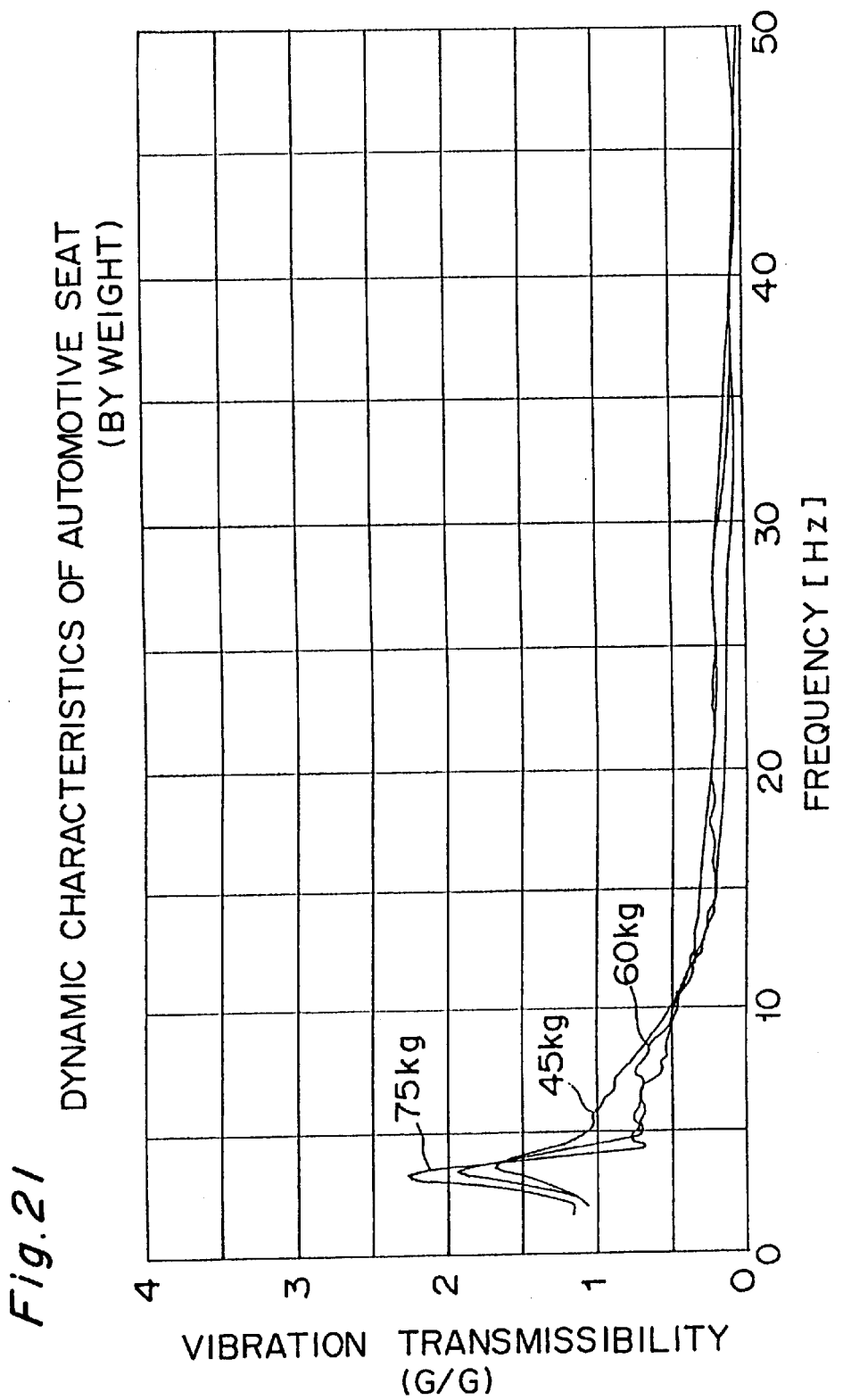

Fig. 45(a)
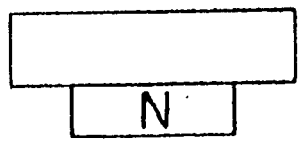
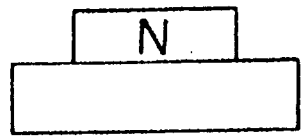
Fig. 45(b)
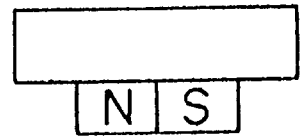
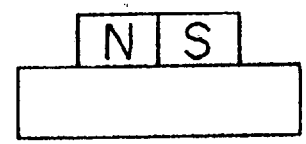
Fig. 45(c)
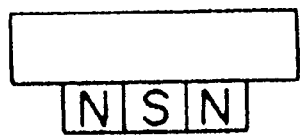
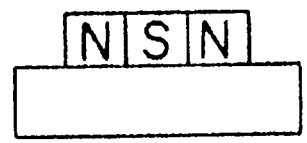
Fig. 45(d)
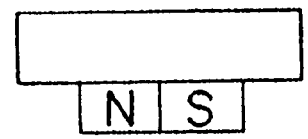
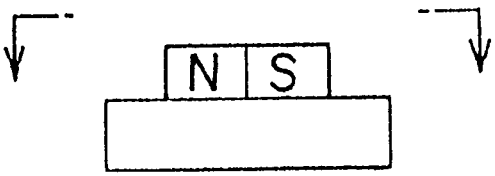
Fig. 45(e)
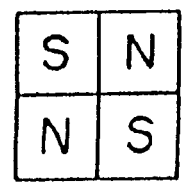

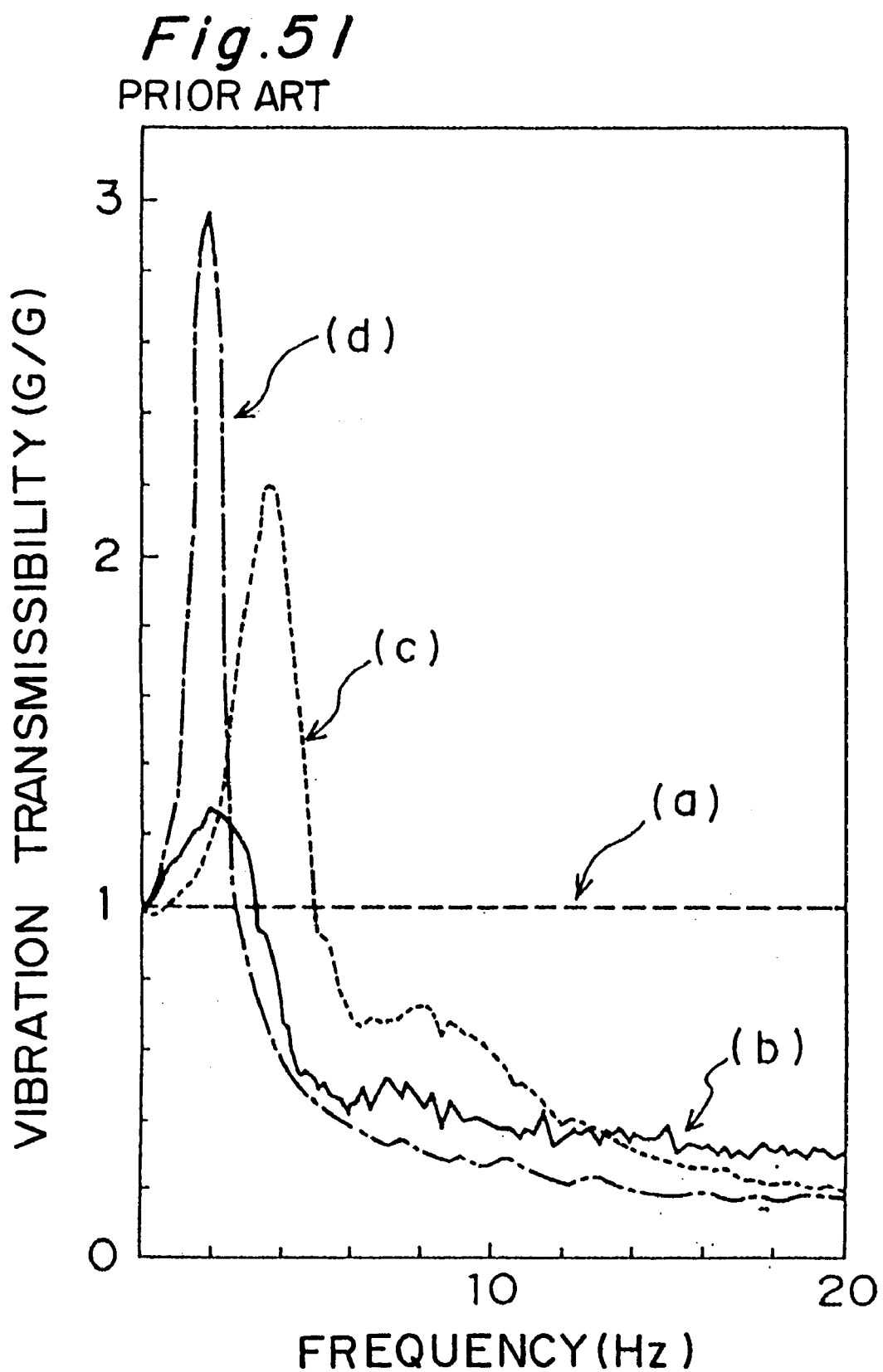

MAGNETIC SPRING HAVING DAMPING CHARACTERISTICS AND VIBRATION MECHANISM HAVING SAME

TECHNICAL FIELD

The present invention relates generally to a magnetic spring having a plurality of permanent magnets and, more particularly, to a magnetic spring having positive, 0- or negative damping characteristics by utilizing the repulsive force of a plurality of permanent magnets. The present invention also relates to a stable nonlinear vibration mechanism or coefficient exciting vibration mechanism having said magnetic spring and no physical damping structure.

BACKGROUND ART

Currently, various vibration models have been proposed and put to practical use. In general, vibration characteristics depend on the loaded mass and the input. It is considered that there is a correlation between the loaded mass and the curvature of load-deflection characteristics, and between the input and the hysteresis of load-deflection characteristics.

For example, in suspension systems for automotive vehicles, the points for adjusting ride comfort, such as the spring constant of the suspension systems, are the road surface condition, the control stability, and the impedance (or the difference thereof condition. For the optimization under all the conditions, the active control is needed. Annoying road driving or high-speed driving result in significant differences in a low frequency and high amplitude region. In the case where the damping force is low, the transmissibility of deflection will increase, and the resonance frequency will shift to the lower frequency region. In order to increase the damping force, it is necessary to increase the damping ratio of a damper, or decrease the spring constant. Therefore, conventional passive vibration models have a limit on their performance.

As concrete examples, suspension seats are described hereinafter. The suspension seats are the seats available mainly in off-road vehicles, such as earth-moving machines or recreational vehicles (RV), or long-distance travelling vehicles, such as trucks or busses, and equipped with a vibration isolator mechanism. As the vibration isolator mechanism, metal springs, an air suspension, air dampers or the like are used. In these seats, the isolation of seat vibration has been improved within the frequency range from about 1.5 to 12 Hz, especially from 3 to 5 Hz. Therefore, suspension seats have a resonance frequency in the range of 1 to 2.5 Hz.

FIG. 51 depicts the vibration characteristics of conventional suspension seats. In FIG. 51, (a) indicates a rigid seat, (b) a suspension seat, (c) a spring-rich seat, and (d) a suspension seat having no damper.

In the seats with a low stiffness (i.e. soft ride comfort), there will be a large dynamic deflection when exposed to some shocks or to low frequency vibration. However, the travel of seat suspension mechanisms is usually limited to less than 100 mm so as not to interfere with the driver's operations such as, for example, depression of a pedal and the like. In the case of large dynamic deflections, it will cause the suspension seat to produce an end-stop impact.

In order to investigate the influences of the end-stop-impact on the performance of the suspension seat, Stiles performed a field survey of tractor driving in 1994. He found that 45% of suspension seats increased the acceleration levels experienced by the driver. He suggested that the end-stop impacts deteriorated the isolation efficiencies of the suspension seats. A shock absorber is used as a solution to a sudden or transient bump experienced by the vehicle.

Recently, an active suspension seat has been proposed wherein an actuator mounted to the seat works to active-control vibrations to enhance the ride comfort.

However, the vibration isolator mechanism employing the metal springs, air suspension, air dampers or the like cannot enhance the ride comfort or the feeling of use by decreasing a vibration frequency of 4–20 Hz from among vibrations transmitted through the vehicle floor.

Furthermore, the active suspension seat is heavy and expensive and is also required to always activate the actuator. If the actuator is turned off, vibrations are transmitted to a seat occupant through the actuator, thus losing the ride comfort.

On the other hand, in the suspension seat employing the shock absorber, if the damping force is too great, it may worsen the vibration isolation performance of the seat in the low and middle frequency region, i.e., at more than about 1.4 times of the resonance frequency.

The present invention has been developed to overcome the above-described disadvantages. It is accordingly an objective of the present invention to provide a magnetic spring having positive, 0- or negative damping characteristics by utilizing permanent magnets. Another objective of the present invention is to realize an inexpensive dynamic-characteristic control system or highly efficient engine of a simple construction by providing a stable nonlinear vibration mechanism or coefficient exciting vibration mechanism having the aforementioned magnetic spring and no physical damping structure.

DISCLOSURE OF THE INVENTION

In accomplishing the above and other objectives, the magnetic spring according to the present invention has 0- or negative damping characteristics and comprises at least two permanent magnets spaced from each other and having variable geometric dimensions defined therebetween, and a kinetic mechanism for moving the at least two permanent magnets placed therein. The geometric dimensions of the at least two permanent magnets are changed by the kinetic mechanism or an external force at the time of input and at the time of output, and are converted into a repulsive force so that the repulsive force from a balanced position of the at least two permanent magnets may be made greater at the time of input than at the time of output.

The maximum repulsive force can be generated at the closest position of the at least two permanent magnets or the position having passed the closest position.

The geometric dimensions can be changed by changing any one of the distance between the at least two permanent magnets, the opposing area thereof, the magnetic flux density, and the magnetic field.

Furthermore, the magnetic spring of the present invention can have positive damping characteristics and comprises at least two permanent magnets spaced from each other and having variable geometric dimensions defined therebetween, and a kinetic mechanism for moving the at least two permanent magnets placed therein. The geometric dimensions of the at least two permanent magnets are changed by the kinetic mechanism or an external force at the time of input and at the time of output to derive a damping term, thereby providing nonlinear damping and spring characteristics.

In the above-described construction, the maximum repulsive force can be generated at the closest position of the at least two permanent magnets. Also, the geometric dimensions can be changed by changing any one of the distance between the at least two permanent magnets, the opposing area thereof, the magnetic flux density, and the magnetic field.

Moreover, a coefficient exciting vibration mechanism according to the present invention comprises a magnetic spring having at least two permanent magnets spaced from each other so as to have variable geometric dimensions defined therebetween, and a kinetic mechanism for moving the at least two permanent magnets placed therein. The geometric dimensions of the at least two permanent magnets are changed by the kinetic mechanism or an external force, thereby causing the magnetic spring to have 0- or negative damping characteristics and converting energy into continuous oscillation or diverging vibration.

In the above-described construction, the geometric dimensions can be changed by an external force to change a spring constant and a damping coefficient within the kinetic mechanism. Also, the geometric dimensions can be changed by the kinetic mechanism or an external force to improve vibration characteristics or make an exciting or resonant frequency variable, thereby causing the resonant frequency to follow the exciting frequency to reduce the resonant frequency or a change in amplitude.

Furthermore, the geometric dimensions are changed by the kinetic mechanism or an external force, thereby providing negative damping when a deflection is small and positive damping when the deflection is increased so that vibration is made steady when the negative damping and the positive damping are balanced.

In addition, a nonlinear vibration mechanism according to the present invention comprises a magnetic spring having at least two permanent magnets spaced from each other so as to have variable geometric dimensions defined therebetween, and a kinetic mechanism for moving the at least two permanent magnets placed therein. The geometric dimensions of the at least two permanent magnets are changed by the kinetic mechanism or an external force, thereby causing the magnetic spring to have positive damping characteristics greater than spring characteristics within the kinetic mechanism.

In the above-described construction, the geometric dimensions are changed by the kinetic mechanism or an external force to improve vibration characteristics or make a resonant frequency variable, thereby causing the resonant frequency to follow an exciting frequency to reduce the resonant frequency or a change in amplitude.

A nonlinear vibration mechanism according to another form of the present invention comprises a magnetic spring having at least two permanent magnets spaced from each other so as to have variable geometric dimensions defined therebetween, and a kinetic mechanism for moving the at least two permanent magnets placed therein, wherein the geometric dimensions of the at least two permanent magnets are changed by the kinetic mechanism or an external force to make a resonant frequency variable, thereby causing the resonant frequency to follow an exciting frequency to increase the resonant frequency or a change in amplitude so that a large acceleration or amplitude is produced with a small input.

BRIEF DESCRIPTION OF THE DRAWINGS

FIG. 5 is a schematic diagram depicting mutually spaced permanent magnets with the same magnetic poles opposed to each other and also depicting the case where one of the permanent magnets is moved relative to the other (to change the opposing area);

FIG. 8 is a schematic diagram depicting mutually spaced permanent magnets with the same magnetic poles opposed to each other and also depicting the case where one of the magnets is rotated relative to the other (to change the opposing area);

FIG. 20 is a graph showing the dynamic characteristics of the magnetic spring obtained by the use of the apparatus of FIG. 18 when the load is changed with the same magnets used;

FIG. 21 is a graph showing the dynamic characteristics of a conventional automotive seat employed as a comparative example;

FIGS. 45(a), 45(b), 45(c), 45(d) and 45(e) are schematic views of magnet arrangements of magnetic springs different in the number of poles, FIG. 45(a) being a front view of a single-pole magnetic spring, FIG. 45(b) a front view of a two-pole magnetic spring, FIG. 45(c) a front view of a three-pole magnetic spring, FIG. 45(d) a front view of a four-pole magnetic spring, and FIG. 45(e) a top plan view as viewed from the direction of an arrow in (d);

FIG. 51 is a graph showing the vibration characteristics of conventional ordinary suspension seats.

DETAILED DESCRIPTION OF THE PREFERRED EMBODIMENTS

Figure 1:
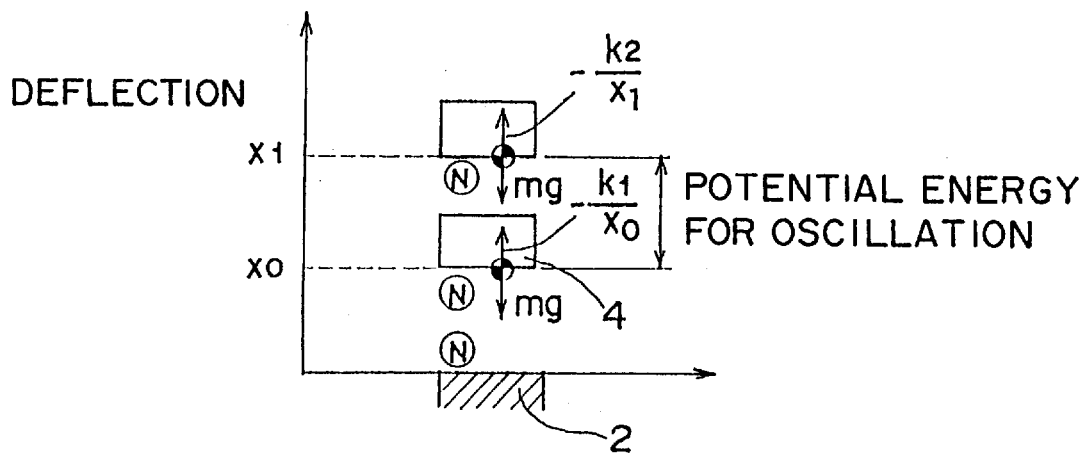
FIG. 1 is a schematic diagram of a magnetic spring according to the present invention, particularly depicting balanced positions of two permanent magnets on the input side and on the output side.

Referring now to the drawings, preferred embodiments of the present invention are discussed hereinafter.

When a magnetic spring structure is made up of at least two spaced permanent magnets with the same magnetic poles opposed to each other, the two spaced permanent magnets are held in non-contact with each other. Accordingly, if the friction loss in the structure itself is small enough to be ignored, the static characteristics thereof are reversible, i.e., the output (return) is on the same line as the input (go) and is nonlinear. Furthermore, negative damping can be easily produced by changing the static magnetic field (the arrangement of the magnets) with a small amount of input utilizing the degree of freedom peculiar to the non-contact pair and the instability of the float control system.

The present invention has been developed taking note of this fact. At the time of input (go) and at the time of output (return), the geometric dimensions between the two permanent magnets are changed by a mechanism inside a kinetic system in which the permanent magnets are placed or by an external force. The change in geometric dimensions is converted into a repulsive force in the kinetic system to make the repulsive force from the balanced position of the two permanent magnets greater at the time of output than at the time of input.

The fundamental principle is explained hereinafter.

Figure 2:
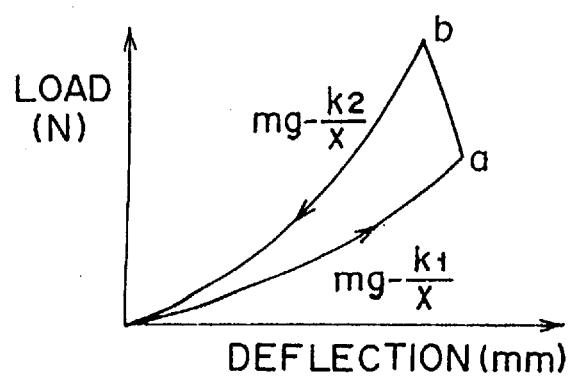
FIG. 2 is a graph of the fundamental characteristics of the magnetic spring of FIG. 1, particularly showing a relationship between the load applied to one of the two permanent magnets and the deflection thereof from the balanced position.

FIG. 1 schematically depicts balanced positions of two permanent magnets 2 and 4 on the input side and on the output side, while FIG. 2 depicts the fundamental characteristics of the magnetic spring structure indicating a relationship between the load applied to one of the two permanent magnets and the deflection thereof from the balanced position.

As shown in FIG. 1, when the balanced position of the permanent magnet 4 on the input side relative to the permanent magnet 2 and the spring constant of the magnetic spring are $x_0$ and k1, respectively, and the balanced position thereof on the output side and the spring constant are $x_1$ and k2, respectively, an area conversion is performed between $x_0$ and $x_1$, and the following relations hold at respective balanced positions.

$$-k1/x_0+mg=0$$

$$-k2/x_1+mg=0$$

$$k2>k1$$

Accordingly, the static characteristics indicate negative damping characteristics, as shown in FIG. 2, and it is conceivable that the potential difference between the position $x_1$ and the position $x_0$ corresponds to the potential energy for oscillation.

A model of FIG. 1 was made and a relationship between the load and the deflection was measured by changing the time during which the load was applied. As a result, a graph shown in FIG. 3 was obtained and can be interpreted as meaning that when the two permanent magnets 2 and 4 approache their closest position, a great repulsive force is produced, and that when the amount of deflection from the balanced position changes slightly, a friction loss is produced by a damper effect of the magnetic spring, thus creating a damping term.

Figure 3:
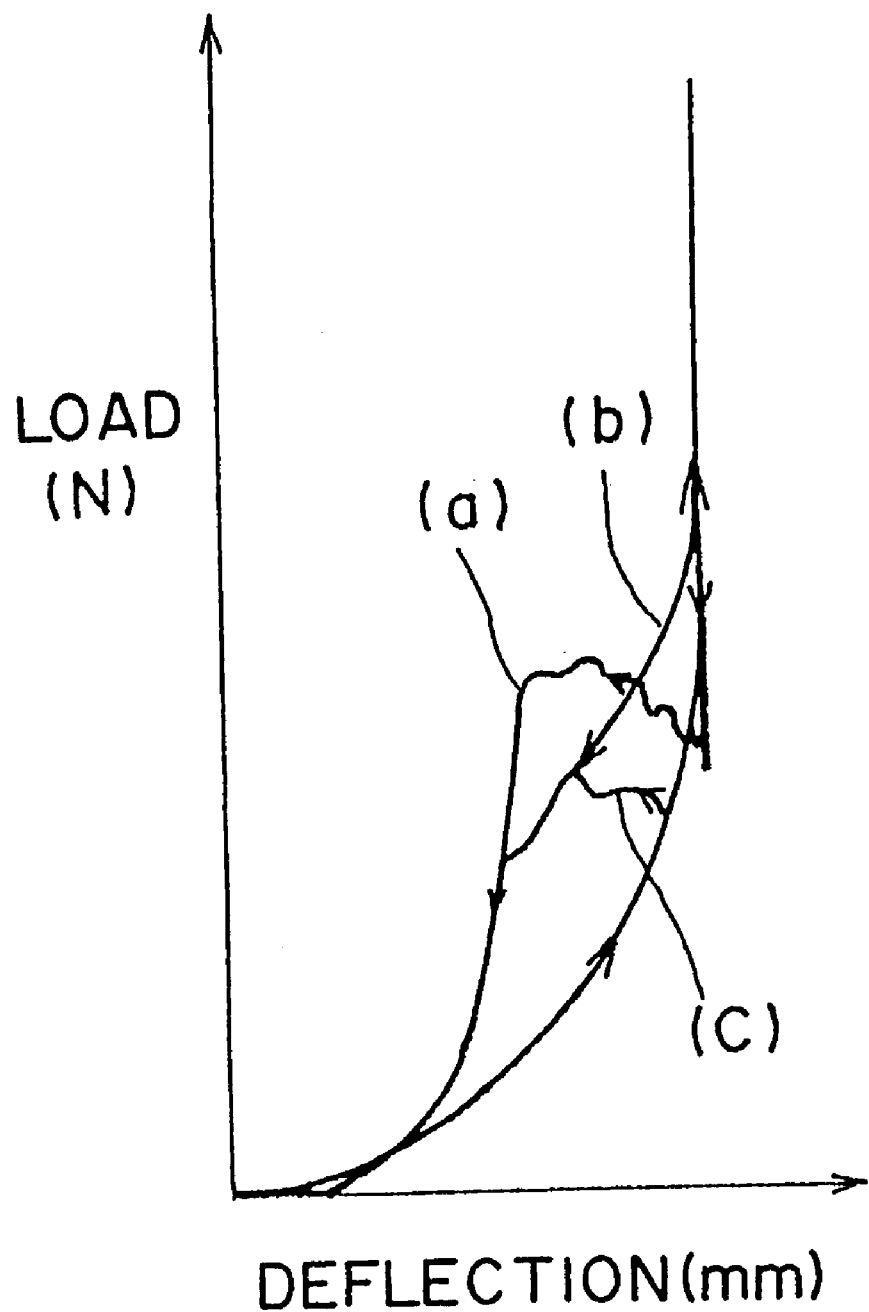
FIG. 3 is a graph showing a relationship between the load measured and the deflection.

In FIG. 3, (a) is a curve obtained when a constant load was applied, and the time during which the load was being applied becomes shorter in the order of (a), (b) and (c). In other words, the static characteristics vary according to the manner in which the load is applied, and the longer the time during which the load is applied, the greater the impulse.

As for rare-earth magnets, the strength of magnetization does not depend upon the magnetic field. More specifically, because the internal magnetic moment is not easily influenced by the magnetic field, the strength of magnetization on a demagnetization curve hardly changes, and the value is kept almost the same as that of saturation magnetization. Accordingly, in the case of rare-earth magnets, the force can be calculated using a charge model assuming that the magnetic load is uniformly distributed on its surfaces.

Figure 4A:
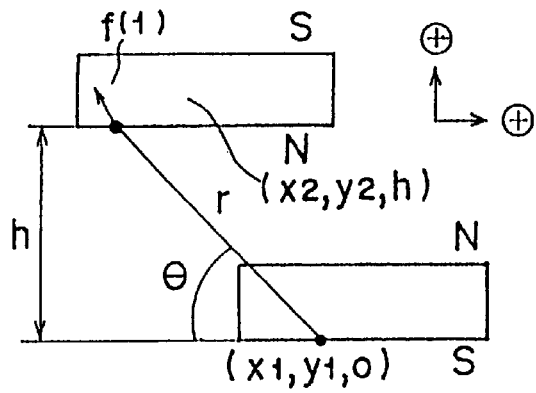
FIGS. 4(a), 4(b) and 4(c) are schematic diagrams depicting the way of thinking of input and output in a charge model assuming that magnetic charges are uniformly distributed on end surfaces of the permanent magnets, FIG. 4(a) showing attraction, FIG. 4(b) showing repulsion, and FIG. 4(c) showing repulsion at locations different from those of (b)

FIG. 4 depicts the way of thinking in which a magnet is defined as a set of smallest unit magnets. The relationship of forces acting among the unit magnets was calculated by classifying it into three. FIG. 4(a) Attraction (because the unit magnets are identical in both r and m, two types are defined by one)

$$f^{(1)}=(m^2/r^2)dx_1dy_1dx_2dy_2$$

$$f_x^{(1)}=f^{(1)} \cos \theta$$

$$f_z^{(1)}=f^{(1)} \sin \theta$$

Figure 4B:
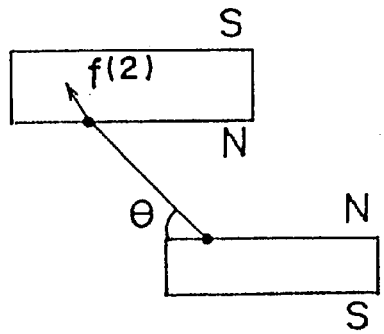

FIG. 4(b) Repulsion $$f_x^{(2)}=f^{(2)} \cos \theta$$

$$f_z^{(2)}=f^{(2)} \sin \theta$$

Figure 4C:
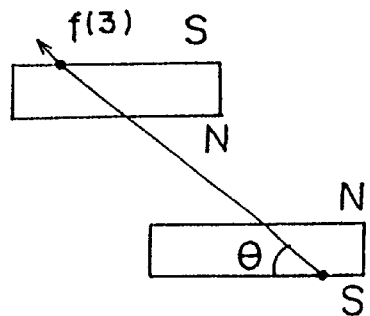

FIG. 4(c) Repulsion $$f_x^{(3)}=f^{(3)} \cos \theta$$

$$f_z^{(3)}=f^{(3)} \sin \theta$$

Accordingly, $$-f_x=2f_x^{(1)}-f_x^{(2)}-f_x^{(3)}$$

$$-f_z=2f_z^{(1)}-f_z^{(2)}-f_z^{(3)}$$

Hereupon, the Coulomb's law is expressed by:

| $F=k(q_1q_2/r^2)$ | r: distance |
| q=MS | q1, q2: magnetic charge |
| | M(m): strength of magnetization |
| | S: area |

The forces can be obtained by integrating the above ($-f_x$) and ($-f_z$) with respect to the range of the magnet size.

Figure 6:
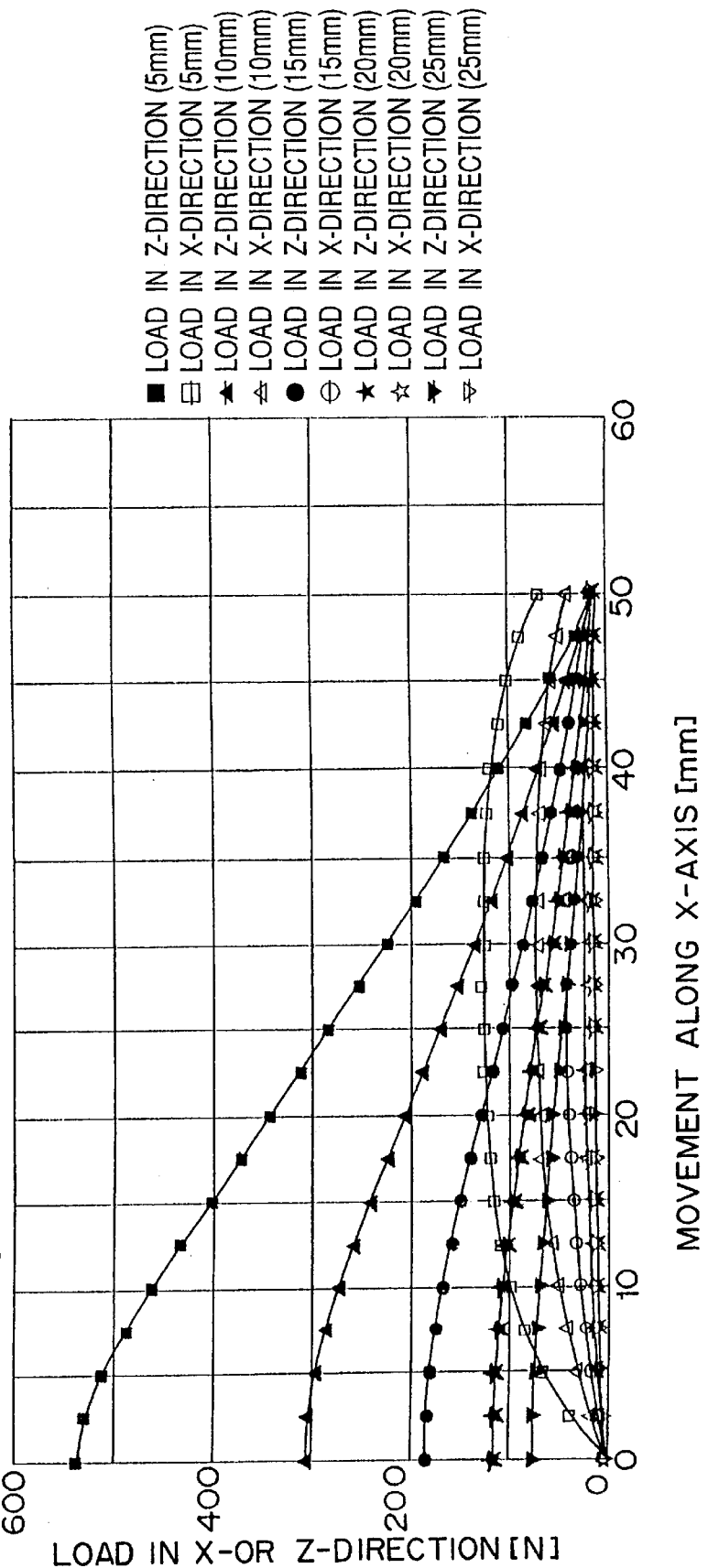
FIG. 6 is a graph showing the load in X-axis and Z-axis directions relative to the amount of movement in X-axis direction when calculation has been carried out based on FIG. 5.

As shown in FIG. 5, calculation was carried out for each magnetic gap by moving one of two opposing magnets relative to the other from the condition in which they are completely lapped (the length of movement x=0 mm) to the condition in which one of them is completely slipped (the length of movement x=50 mm). The results of calculation is shown in FIG. 6. Although the internal magnetic moment is defined as being constant, it is somewhat corrected because disorder is caused around the magnets when the magnetic gap is small.

The above results of calculation are generally in agreement with the results of actual measurement. The force required for moving the point (a) to the point (b) in FIG. 2 is the x-axis load, while the output is represented by the z-axis load. The relationship of input<output caused by instability is statically clarified.

Figure 7:
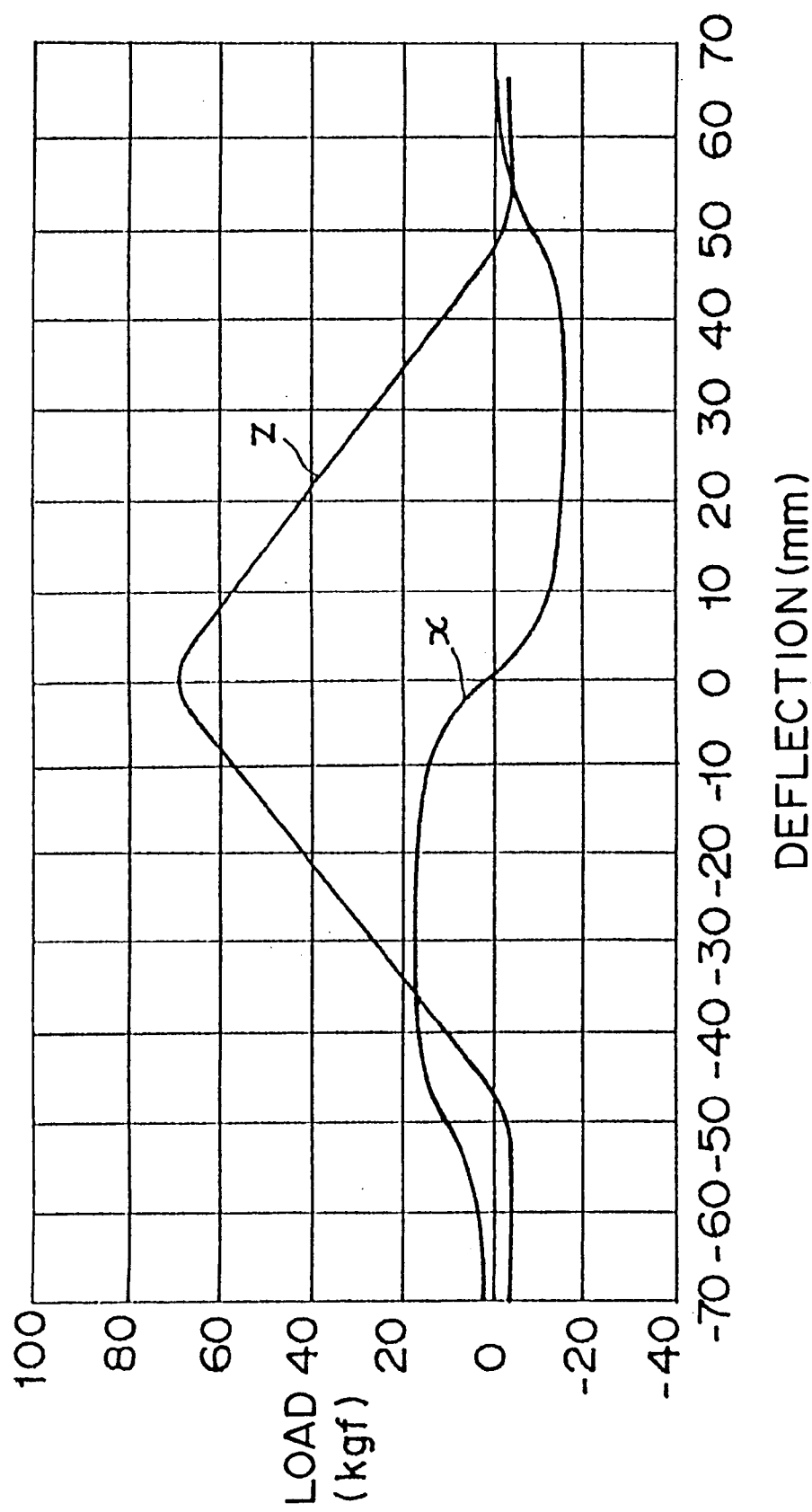
FIG. 7 is a graph showing a relationship between the load and deflection when the distance between the permanent magnets of FIG. 5 is kept constant, and one of the magnets is moved relative to the other from the completely slipped condition to the completely lapped one, and again to the completely slipped one.

FIG. 7 is a graph indicating the relationship between the x-axis load and the z-axis load when the distance between the magnets is kept as 3 mm, and the condition of the magnets is changed from the completely slipped condition to the completely lapped one, and again to the completely slipped one. This graph is a characteristic curve indicating that the absolute value of the x-axis load is the same but the direction of output is reversed. When one of the magnets is moved relative to the other to approach the completely lapped condition, the former receives a resistance, resulting in damping. On the other hand, when one of the magnets are moved relative to the other from the completely lapped condition to the completely slipped condition, the former is accelerated. These characteristics can be used in a non-contact damper to reduce the vibration energy or to improve the transmissibility in the low, middle and high frequency region (0–50 Hz) which human beings can sense, though conventional dampers could not achieve this.

Figure 9:
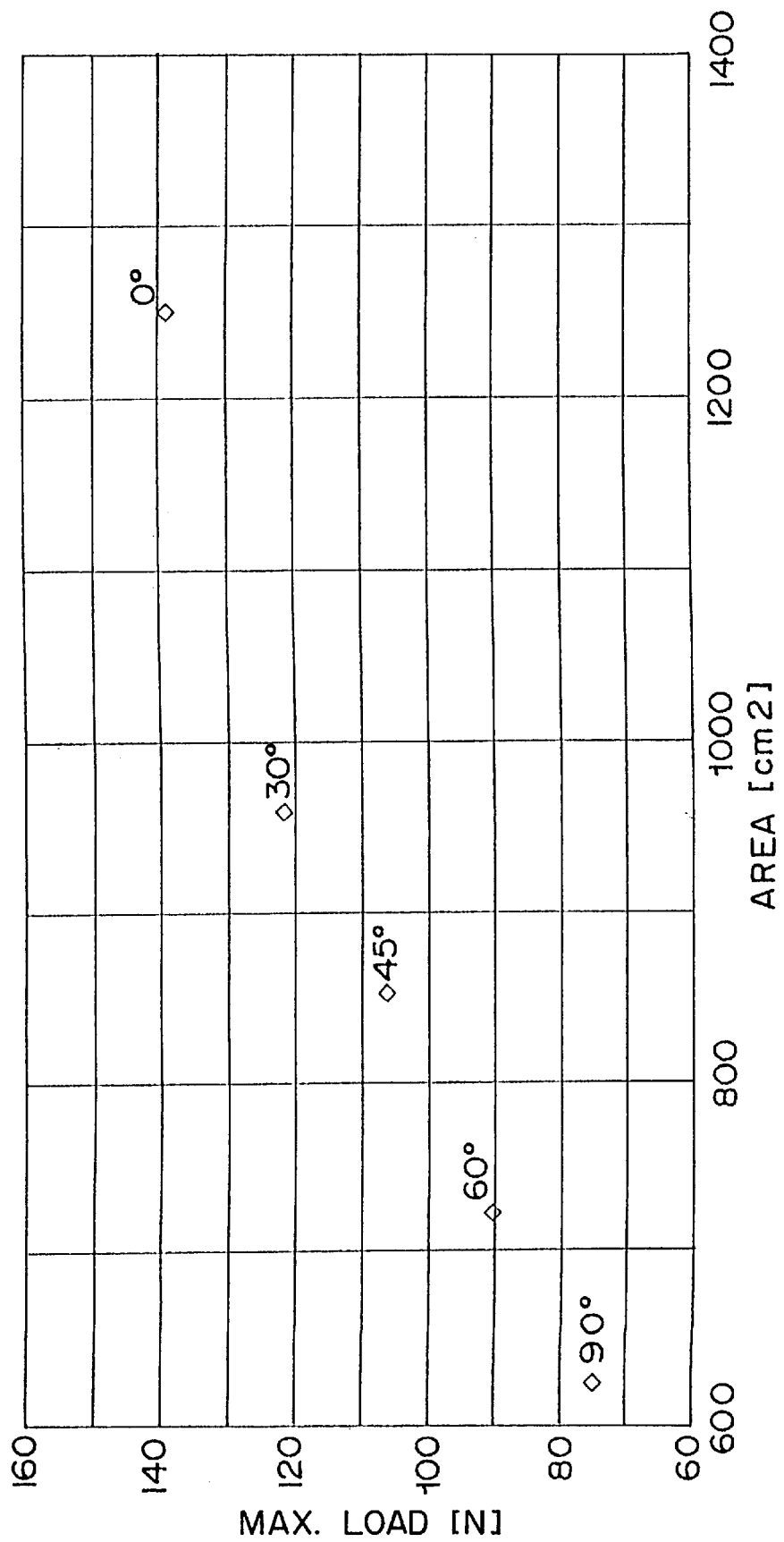
FIG. 9 is a graph showing the maximum load relative to the opposing area when one of the magnets is rotated, as shown in FIG. 8.

When the rotational angle of the opposing magnets is changed as shown in FIG. 8, a graph shown in FIG. 9 was obtained. As a matter of course, the maximum load decreases as the opposing area decreases. This graph indicates that the output can be changed through an area conversion which can be performed by applying a predetermined input.

Figure 10:
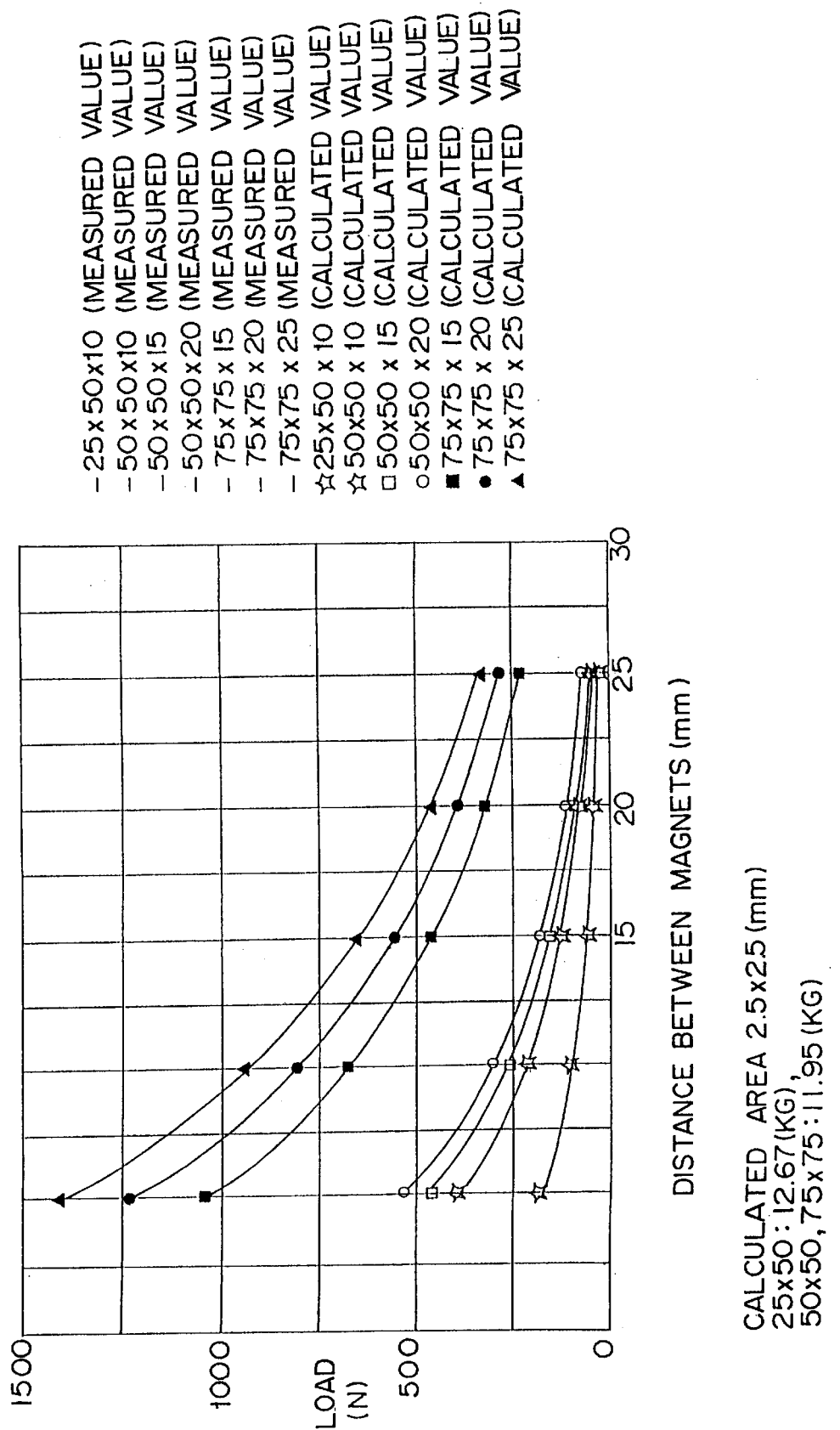
FIG. 10 is a graph showing a relationship between the load and the distance between the magnets when neodymium-based magnets are employed.

FIG. 10 is a graph indicating a relationship between the load and the distance between the magnets when neodymium-based magnets are employed. The repulsive force increases with an increase in mass. The repulsive force F is given by:

$$F \, Br^2 \times (\text{geometric dimensions})$$

Br: strength of magnetization

The geometric dimensions mean the size determined by the distance between the opposing magnets, the opposing area, the magnetic flux density, the strength of the magnetic field or the like. If the magnet material is the same, the strength of magnetization (Br) is constant and, hence, the repulsive force of the magnets can be changed by changing the geometric dimensions.

Figure 11:
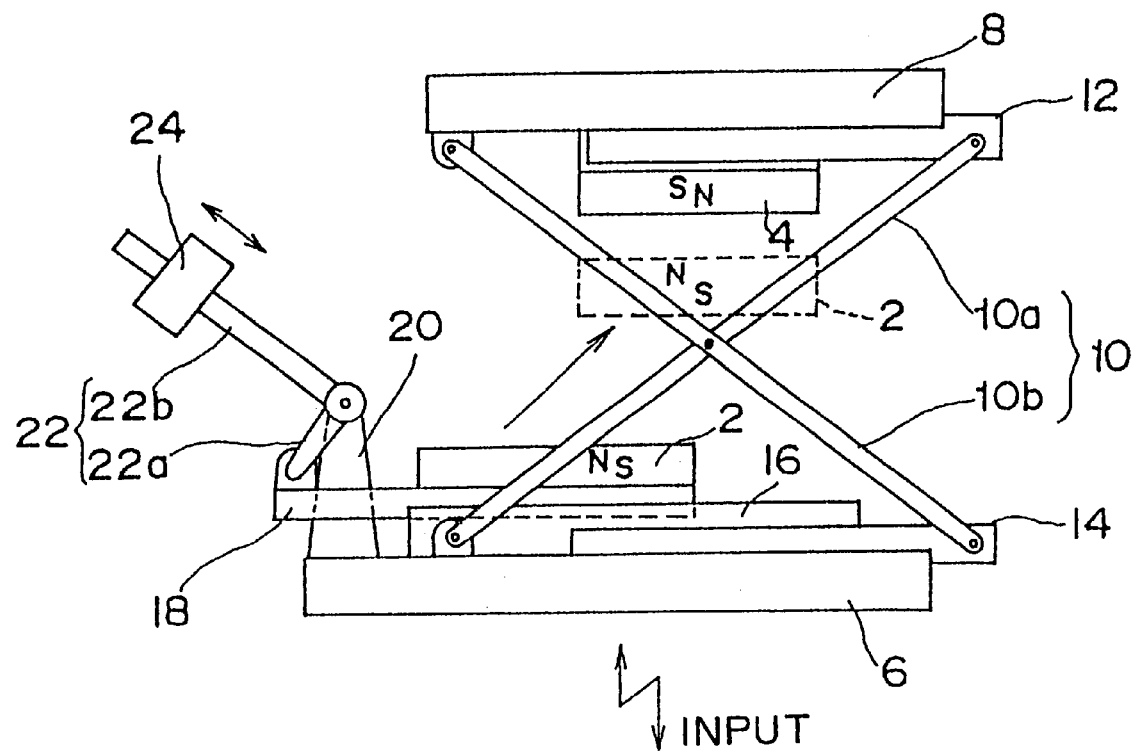
FIG. 11 is a front view of a first magnetic spring model wherein the geometric dimensions are changed by changing the opposing area of the permanent magnets.

FIG. 11 depicts a first specific magnetic spring model wherein the geometric dimensions are changed by changing the opposing area of magnets 2 and 4. In FIG. 11, a base 6 and a top plate 8 extending parallel to each other are connected by two X-links 10 each having two links 10a and 10b. One end of the link 10a and that of the link 10b are pivotally mounted on the base 6 and the top plate 8, respectively, while the other end of the link 10a and that of the link 10b are pivotally mounted on an upper slider 12 slidably mounted on the top plate 8 and a lower slider 14 slidably mounted on the base 6, respectively.

The base 6 has a linear way 16 fixedly mounted thereon on which a magnet platform 18 having the permanent magnet 2 placed thereon is slidably mounted, while the permanent magnet 4 is fixedly mounted on the top plate 8. The base 6 also has a support 20 secured thereto on which a generally central portion of an L-shaped lever 22 comprised of a first arm 22a and a second arm 22b is pivotally mounted. The first arm 22a has one end pivotally mounted on the magnet platform 18, while the second arm 22b has a balance weight 24 mounted thereon.

In the above-described construction, when a certain input is applied to the base 6 to move the base 6 towards the top plate 8, the magnet platform 18 is moved rightwards along the linear way 16 by means of the inertia force of the balance weight 24. As a result, the opposing area of the two permanent magnets 2 and 4 gradually increases, and the maximum repulsive force is produced at the closest position of the permanent magnets 2 and 4 or the position having passed such a position. The base 6 is then moved downwards by the repulsive force. While the base 6 is being moved towards and then away from the top plate 8, the magnetic spring of FIG. 11 exhibits negative damping characteristics as shown in FIG. 3. Because the balance weight 24 is slightly delayed in phase relative to the base 6, the position where the maximum repulsive force is produced can be regulated by moving the balance weight 24 along the second arm 22b according to the input. Moreover, the timing of the opposing area can be regulated by interlocking the permanent magnet 4 with the upper slider 12.

Figure 12:
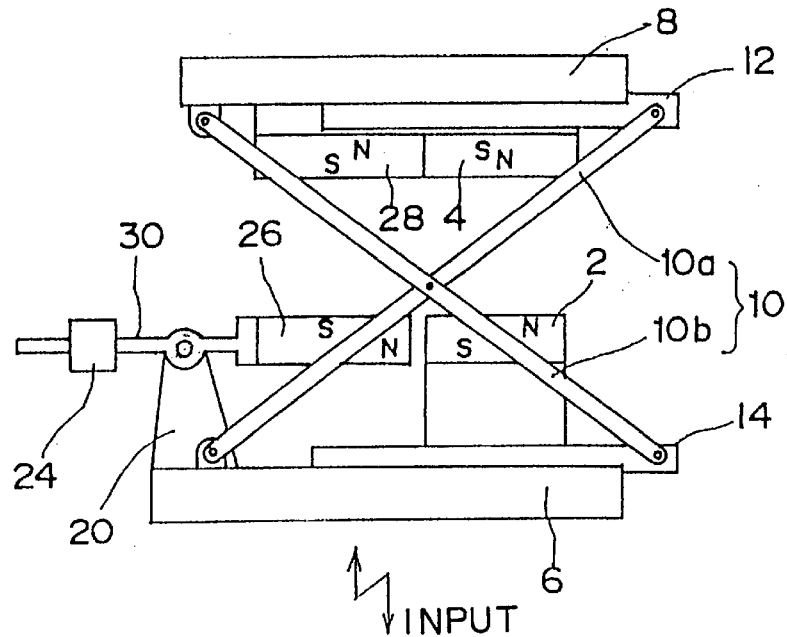
FIG. 12 is a front view of a second magnetic spring model wherein the geometric dimensions are changed by changing the distance between the permanent magnets.

FIG. 12 depicts another model having two permanent magnets 2 and 4 fixedly mounted on the base 6 and the top plate 8, respectively, and also having two additional permanent magnets 26 and 28 utilized to change the geometric dimensions by changing the gap (distance) between them.

In FIG. 12, the permanent magnet 28 is fixed to the top plate 8 with the S-pole thereof directed downwards in contrast with the permanent magnet 4, while the permanent magnet 26 is fixed to one end of a rocking arm 30 with the S-pole thereof directed upwards in contrast with the permanent magnet 2. A central portion of the rocking arm 30 is pivotally mounted on the support 20, and a balance weight 24 is mounted on the rocking arm 30 on the side opposite to the permanent magnet 26.

In the above-described construction, because the two permanent magnets 2 and 26 are mounted on the base 6 with opposite magnetic poles thereof opposed to each other, the magnetic attraction acts therebetween as a balancing spring. When a certain input is applied to the base 6 to move the base 6 towards the top plate 8, the permanent magnet 26 is moved upwards by the inertia force of the balance weight 24 against the magnetic attraction of the permanent magnet 2. As a result, the gap or distance between the permanent magnets 26 and 28 gradually changes, and the maximum repulsive force is produced at the closest position thereof or the position having passed such a position. The base 6 is then moved downwards by the repulsive force. While the base 6 is being moved towards and then away from the top plate 8, the magnetic spring of FIG. 12 exhibits negative damping characteristics as shown in FIG. 3. As is the case with the model of FIG. 11, the position where the maximum repulsive force is produced can be regulated by moving the balance weight 24 along the rocking arm 30 according to the input.

Figure 13:
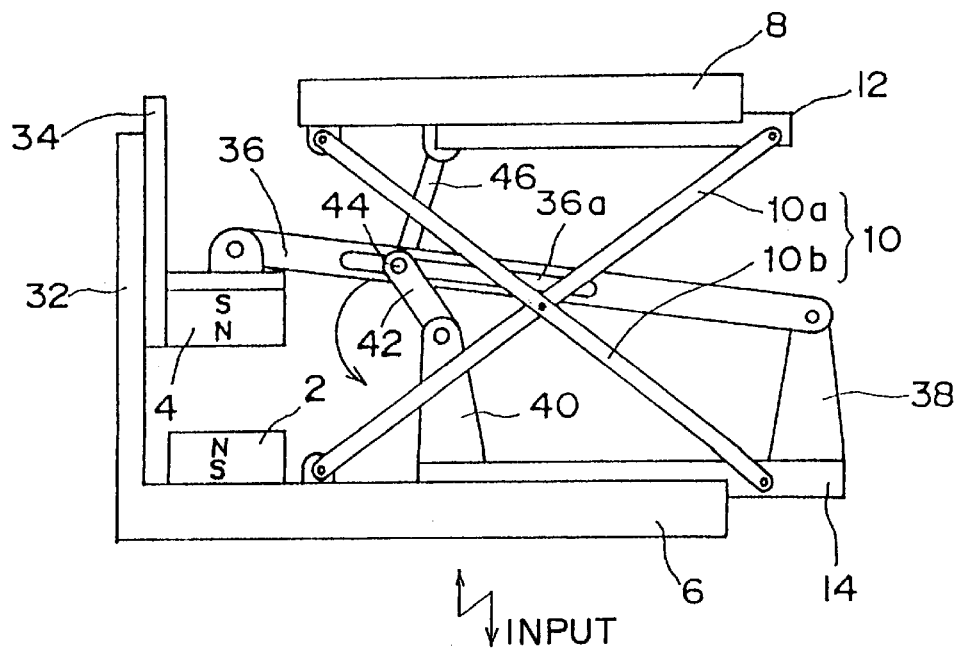
FIG. 13 is a front view of a third magnetic spring model wherein the geometric dimensions are changed by the combination with a lever-ratio conversion.

FIG. 13 depicts a further model wherein the geometric dimensions of the two opposing permanent magnets 2 and 4 are changed by utilizing a rotary lever.

In FIG. 13, the permanent magnet 2 is fixed to the base 6, while the permanent magnet 4 opposing the permanent magnet 2 is fixed to a mount 34 which is slidably mounted on a frame 32 extending upwards from the base 6. A link 36 is pivotally connected at one end thereof to the mount 34 and at the other end thereof to a first support 38 fixed to one side of the lower slider 14. A second support 40 is fixed to the other side of the lower slider 14, and a lever 42 is pivotally connected at one end thereof to the second support 40 and has a pin 44 mounted on the other end thereof. The pin 44 is loosely inserted into an elongated opening 36a defined in an intermediate portion of the link 36 and is also mounted on a lower end of an arm 46 pivotally mounted on the top plate 8.

In the above-described construction, when a certain input is applied to the base 6 to move the base 6 towards the top plate 8, the lever 42 is rotated in a direction shown by an arrow, thereby causing the two permanent magnets 2 and 4 to come near. Because the same magnetic poles of the permanent magnets 2 and 4 are opposed to each other, rotation of the lever 42 gradually increases the repulsive force. After the permanent magnets 2 and 4 have passed the closest position thereof, the permanent magnets 2 and 4 are moved away from each other by the repulsive force. While the base 6 is being moved towards and then away from the top plate 8, the lever ratio gradually changes and the magnetic spring of FIG. 13 exhibits negative damping characteristics as shown in FIG. 3.

Figure 14:
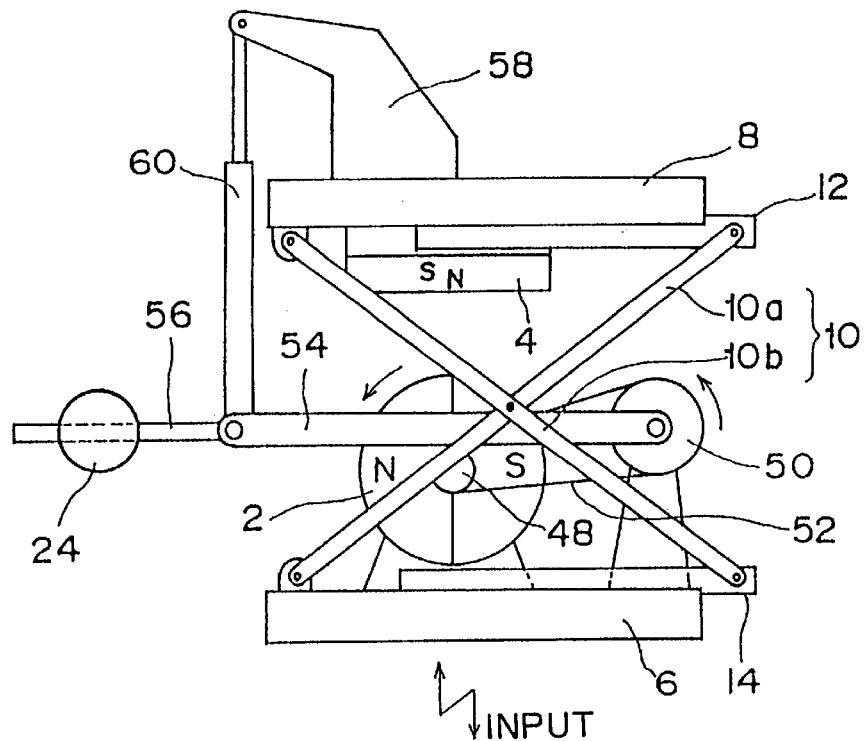
FIG. 14 is a front view of a fourth magnetic spring model wherein the geometric dimensions are changed by a pole conversion.

FIG. 14 depicts a magnetic spring wherein the geometric dimensions are changed by utilizing a pole conversion of the permanent magnets.

In FIG. 14, the permanent magnet 2 is rotatably mounted on the base 6 and has a small-diameter pulley 48 fixed thereto. This pulley 48 is connected via a belt 52 to a large-diameter pulley 50 rotatably mounted on the base 6. The pulley 50 is connected at the center thereof to one end of a link 54, the other end of which is connected to a lever 56 on which a balance weight 24 is mounted. The position of a lower end of the balance weight 24 is restrained by a spring member 60 mounted on the top plate 8 via a bracket 58.

In the above-described construction, when a certain input is applied to the base 6 to move the base 6 towards the top plate 8, the large-diameter pulley 50 is rotated in a direction of an arrow by the inertia force of the balance weight 24 and, hence, the permanent magnet 2 together with the belt 52 is rotated in the same direction. As a result, the S-pole of the permanent magnet 2 is attracted by the N-pole of the permanent magnet 4 fixed to the top plate 8. However, when the balance weight 24 follows with a certain delay in phase, the permanent magnet 2 is rotated in a direction opposite to the arrow and the N-pole thereof is opposed to that of the permanent magnet 4. The opposition of the same magnetic poles produces a repulsive force which in turn moves the base 6 downwards away from the top plate 8. While the base 6 is being moved up and down, the magnetic spring of FIG. 14 exhibits negative damping characteristics as shown in FIG. 3.

Figure 15:
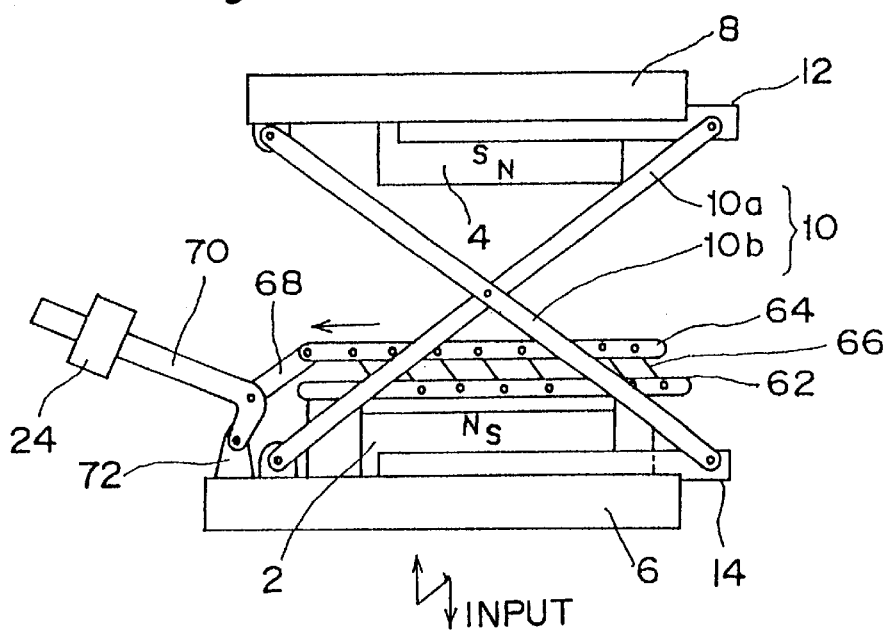
FIG. 15 is a front view of a fifth magnetic spring model wherein the geometric dimensions are changed by a magnetic-circuit conversion.

FIG. 15 depicts a magnetic spring wherein the geometric dimensions are changed by changing the magnetic flux density of the permanent magnets.

In FIG. 15, a plurality of shielding plates 66 are pivotally connected at both ends thereof to a first support plate 62 fixed to the base 6 and to a second support plate 64 spaced a predetermined distance from the first support plate 62 and extending parallel thereto. An L-shaped lever 70 is pivotally connected at an intermediate portion thereof to one end of the second support plate 64 via an arm 68. The L-shaped lever 70 has one end pivotally connected to a support 72 fixed to the base 6 and the other end on which the balance weight 24 is mounted.

In the above-described construction, when a certain input is applied to the base 6 to move the base 6 towards the top plate 8, the second support plate 64 is moved in a direction of an arrow by the inertia force of the balance weight 24, thereby causing the shielding plates 66 to shield the permanent magnet 2 from above to some extent. As a result, the magnetic flux density of the permanent magnet 2 mounted on the base 6 is reduced and, hence, the repulsive force thereof against the permanent magnet 4 mounted on the top plate 8 is reduced.

When the balance weight 24 follows with a certain delay in phase, the second support plate 64 is moved in a direction opposite to the arrow to open the upper space of the permanent magnet 2. Accordingly, the repulsive force of the permanent magnets 2 and 4 is increased, and the base 6 is moved downwards away from the top plate 8. While the base 6 is being moved up and down, the magnetic spring of FIG. 15 exhibits negative damping characteristics as shown in FIG. 3.

The dynamic characteristics of the magnetic springs referred to above are explained hereinafter using a characteristic equation of a simplified fundamental model shown in FIG. 16.

Figure 16:
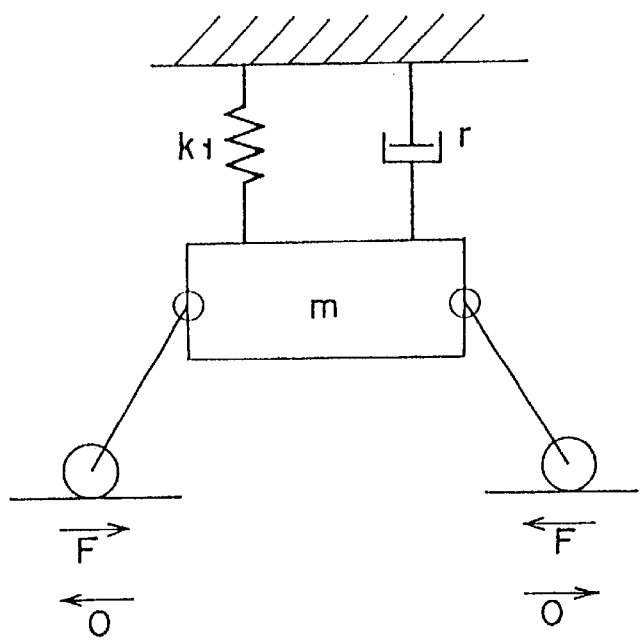
FIG. 16 is a fundamental model explanatory of the characteristics of the magnetic spring.

In FIG. 16, an input F is the force produced by a change in geometric dimensions such as, for example, the area conversion of the permanent magnets.

Figure 17:
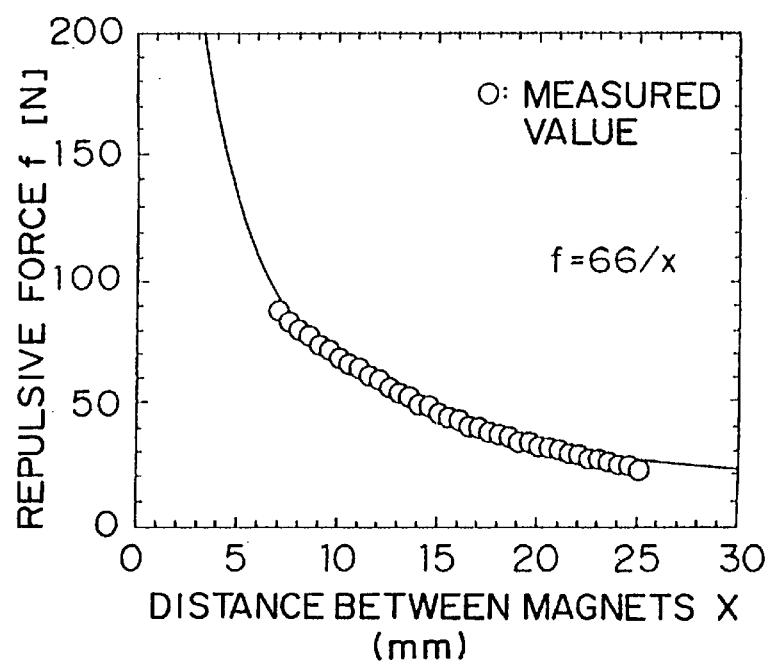
FIG. 17 is a graph showing a relationship between the distance between two opposing permanent magnets and the repulsive force.

FIG. 17 indicates a relationship between the distance (x) of the opposing magnet surfaces and the repulsive force (f) when two permanent magnets (Nd—Fe—B system) having an opposing area of 50×25 mm² and a thickness of 10 mm are opposed so as to repulse each other. A solid line indicates the result of regression analysis obtained by the use of the Levenberg-Marquardt algorithm and is consistent well with a relationship of f=66/x. In other words, the repulsive force acting between the magnet s is given by k/x.

Taking this into account, the characteristics of the magnetic spring were made into a function, and an equation of motion was formulated. Because the repulsive force acting between the magnets is given by k/x, as described above, the characteristic equation is given by:

$$m\ddot{x} + r\dot{x} - \frac{k}{x} + mg = F(t) \quad (1)$$

In FIG. 16, the total mass including the mass of the upper permanent magnet 4 and a load applied to the magnet 4, the spring constant, the damping coefficient, and a harmonic excitation inputted to the mass m are represented by m, k, r, and F(t), respectively.

When the balanced position is expressed as $x_0$ and the deflection from the balanced position is expressed as y, $$-\frac{k}{x_0} + mg = 0, \quad x_0 = \frac{k}{mg}$$

$$x = x_0 + y$$
$$\dot{x} = \dot{y}$$
$$\ddot{x} = \ddot{y}$$

-continued $$\frac{k}{x} = \frac{k}{x_0 + y} = \frac{k}{x_0\left(1 + \frac{y}{x_0}\right)} \approx \frac{k}{x_0}\left(1 - \frac{y}{x_0}\right) \quad [\because y \ll x_0] \quad (2)$$

$$= \frac{k}{x_0} - \frac{k}{x_0^2}y$$

$$m\ddot{x} + r\dot{x} - \frac{k}{x} + mg = m\ddot{y} + r\dot{y} - \frac{k}{x_0 + y} + mg$$

$$= m\ddot{y} + r\dot{y} - \frac{k}{x_0} + \frac{k}{x_0^2}y + \frac{k}{x_0}$$

$$= m\ddot{y} + r\dot{y} + \frac{k}{x_0^2}y$$

If $k/x_0^2 = k'$, $$m\ddot{y} + r\dot{y} + k'y = F(t)$$

If the harmonic excitation $F(t) = Fe^{i\omega t}$ and $y = xe^{i\omega t}$, $$\dot{y} = i\omega x e^{i\omega t}$$
$$\ddot{y} = i^2\omega^2 x e^{i\omega t}$$
$$-m\omega^2 x e^{i\omega t} + ri\omega x e^{i\omega t} + k'x e^{i\omega t} = Fe^{i\omega t}$$
$$(-m\omega^2 x + ri\omega x + k'x)e^{i\omega t} = Fe^{i\omega t}$$
$$x(k' - m\omega^2 + ri\omega) = F$$

$$x = \frac{F}{k' - m\omega^2 + ri\omega}$$

$$= \frac{F(k' - m\omega^2 - ri\omega)}{(k' - m\omega^2 + ri\omega)(k' - m\omega^2 - ri\omega)}$$

$$= \frac{F}{\sqrt{(k' - m\omega^2)^2 + (r\omega)^2}} \left[ \frac{k' - m\omega^2}{\sqrt{(k' - m\omega^2)^2 + (r\omega)^2}} - ir\frac{\omega}{\sqrt{(k' - m\omega^2)^2 + (r\omega)^2}} \right]$$

$$= \frac{F}{\sqrt{(k' - m\omega^2)^2 + (r\omega)^2}}(\cos\phi - i\sin\phi)$$

$$= \frac{F}{\sqrt{(k' - m\omega^2)^2 + (r\omega)^2}} e^{-i\phi}$$

$$y = xe^{i\omega t} = \frac{F}{\sqrt{(k' - m\omega^2)^2 + (r\omega)^2}} e^{i(\omega t - \phi)}$$

$$= \frac{F}{\sqrt{k'^2\left[1 - \left(\frac{\omega}{\omega_0}\right)^2\right]^2 + \left(2\rho\frac{\omega}{\omega_0}\right)^2}} e^{i(\omega t - \phi)}$$

where φ represent the phase angle.

$$\rho = r/2\sqrt{mk'}$$
$$\omega_o^2 = \frac{k'}{m} = \frac{k}{mx_0^2} = \frac{k}{m}\left(\frac{mg}{k}\right)^2 = \frac{m}{k}g^2$$

Accordingly, the natural frequency (resonant frequency) $\phi_0$ is given by:

$$\omega_o \propto \sqrt{\frac{m}{k}}$$

The relationship between the natural frequency and the spring constant is the reverse of the metal spring. In other words, because of the nonlinearity, if the curvature of the optimum load-deflection characteristics can be calculated by adjusting the setting position of the operation point and the magnetic circuit, it may be possible to keep the resonant point constant.

The equation (2) can be expresses as follows.

$$\frac{k}{x} = \frac{k}{x_0 + y} = \frac{k}{x_0\left(1 + \frac{y}{x_0}\right)} = \frac{k}{x_0}\left(\frac{1}{1 + \frac{y}{x_0}}\right)$$

$$= \frac{k}{x_0}\left\{1 - \frac{y}{x_0} + \left(\frac{y}{x_0}\right)^2 - \left(\frac{y}{x_0}\right)^3 + \ldots (-1)^n\left(\frac{y}{x_0}\right)^n + \ldots\right\}$$

$$m\ddot{x} + r\dot{x} - \frac{k}{x} + mg = m\ddot{y} + r\dot{y} + \frac{k}{x_0} -$$

$$\frac{k}{x_0}\left\{1 - \frac{y}{x_0} + \left(\frac{y}{x_0}\right)^2 - \left(\frac{y}{x_0}\right)^3 + \ldots\right\}$$

$$= m\ddot{y} + r\dot{y} + \frac{k}{x_0}\left\{\frac{y}{x_0} - \left(\frac{y}{x_0}\right)^2 + \left(\frac{y}{x_0}\right)^3 - \ldots\right\}$$

Letting y be x and when the equation having up to a term of the third degree is considered, $$m\ddot{x} + r\dot{x} + \frac{k}{x_0^2}x - \frac{k}{x_0^3}x^2 + \frac{k}{x_0^4}x^3 = F(t) \quad (3)$$

$$m\ddot{x} + r\dot{x} + ax - bx^2 + cx^3 = F(t)$$

$$a = \frac{k}{x_0^2} = \left(\frac{mg}{k}\right)^2 k = \frac{(mg)^2}{k} \quad (4)$$

$$b = \frac{k}{x_0^3} = \left(\frac{mg}{k}\right)^3 k = \frac{(mg)^3}{k^2} \quad (5)$$

$$c = \frac{k}{x_0^4} = \left(\frac{mg}{k}\right)^4 k = \frac{(mg)^4}{k^3}$$

The equation (3) has a damping term of $-bx^2$ in the term of the second degree. When the equation (3) is further simplified, $$m\ddot{x} + r\dot{x} + ax - bx^2 = F(t) \quad (6)$$

When $x = x_0 \cos \omega t$, $$x^2 = x_0^2 \cos^2 \omega t = x_0^2(1 - \sin^2 \omega t)$$

$$= x_0^2\left(1 - \frac{1 - \cos 2\omega t}{2}\right) = x_0^2\left(\frac{1 + \cos 2\omega t}{2}\right)$$

$$\approx \frac{x_0^2}{2}$$

$$m\ddot{x} + r\dot{x} + ax - b\frac{x_0^2}{2} = F(t)$$

$$m\ddot{x} + r\dot{x} + ax = F(t) + \frac{b}{2}x_0^2$$

In a vibration region with a small amplitude, a constant repulsive force $((b/2)x_0^2)$ is continuously applied to a periodic external force to attenuate it. That means that, by adjusting the locus of motion of the permanent magnets, damping effect is available without equipping with a damper mechanism.

Figure 18:
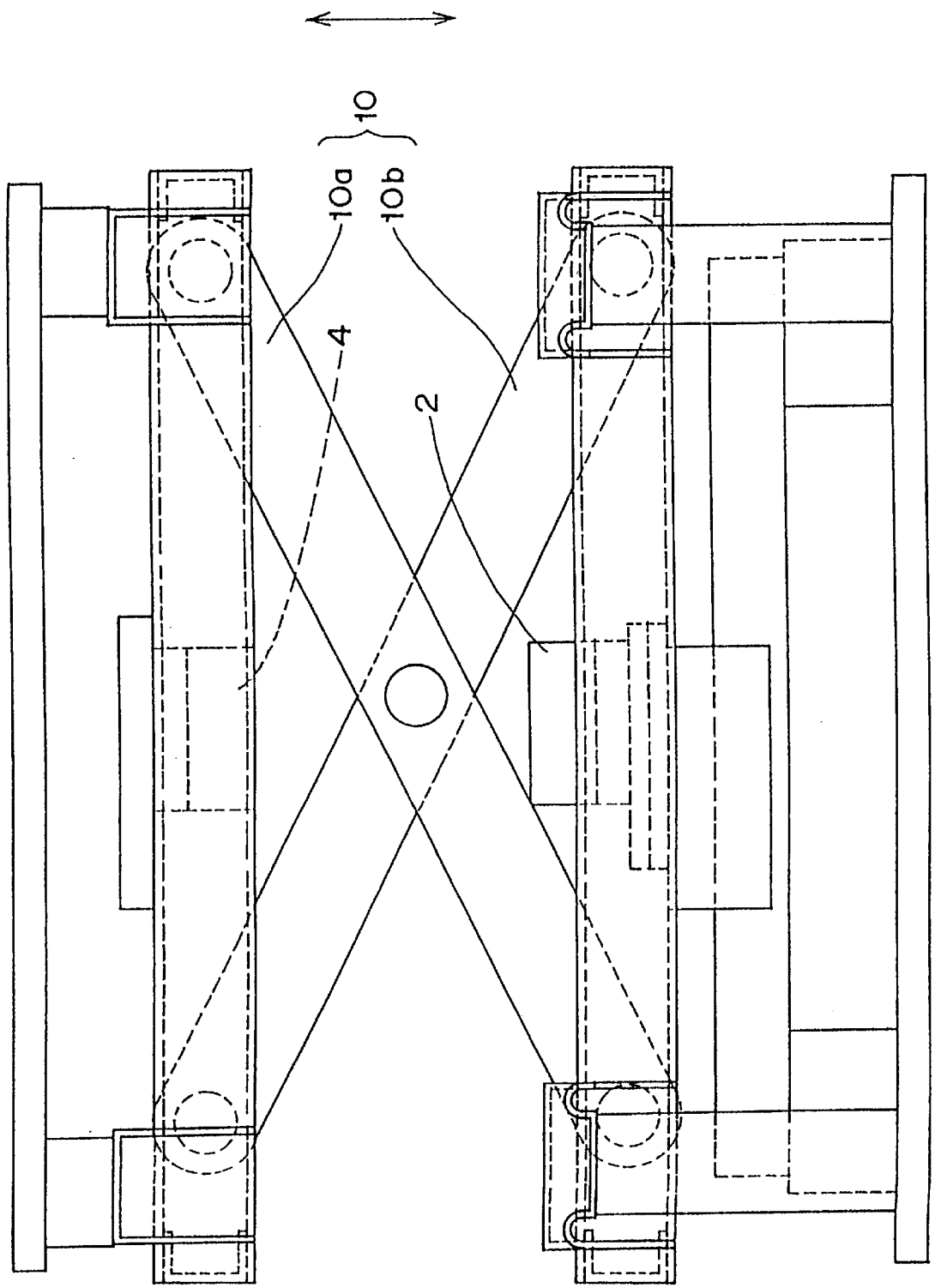
FIG. 18 is a front view of an apparatus used to obtain the static and dynamic characteristics of the magnetic spring without any area conversion.
Figure 19A:
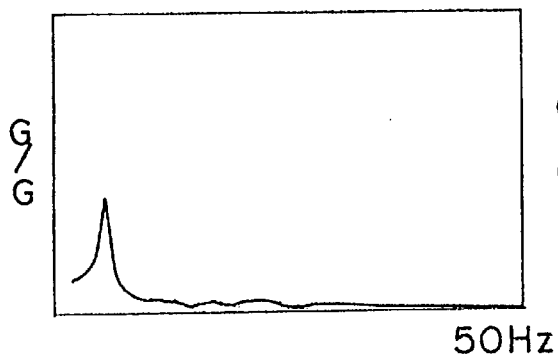
FIGS. 19(a), 19(b), 19(c), 19(d), 19(e), 19(f) are graphs showing the dynamic characteristics of the magnetic spring obtained by the use of the apparatus of FIG. 18, FIG. 19(a) being a graph obtained by the use of magnets of 50×50×10 mm, 19(b) being a graph obtained by the use of magnets of 50×50×15 mm, 19(c) being a graph obtained by the use of magnets of 50×50×20 mm, 19(d) being a graph obtained by the use of magnets of 75×75×15 mm, 19(e) being a graph obtained by the use of magnets of 75×75×20 mm, and 19(f) being a graph obtained by the use of magnets of 75×75×25 mm.
Figure 19B:
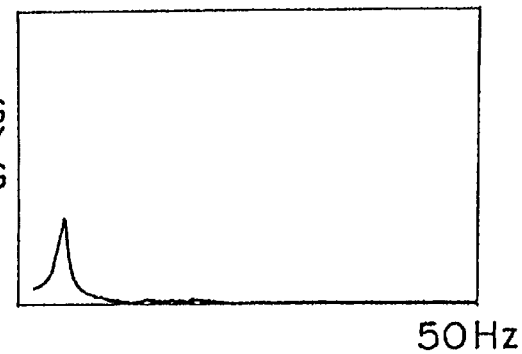
Figure 19C:
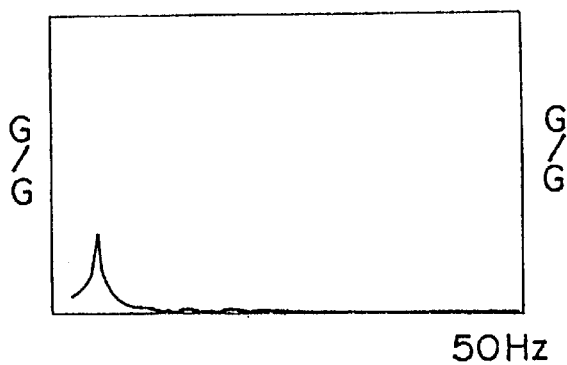
Figure 19D:
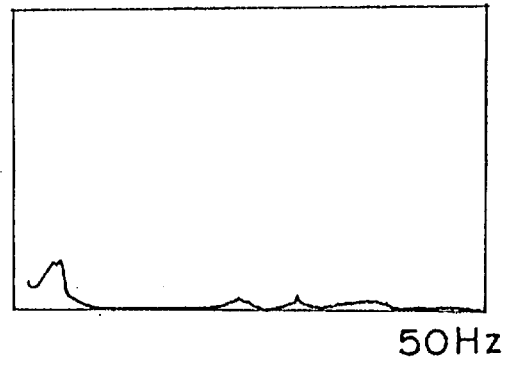
Figure 19E:
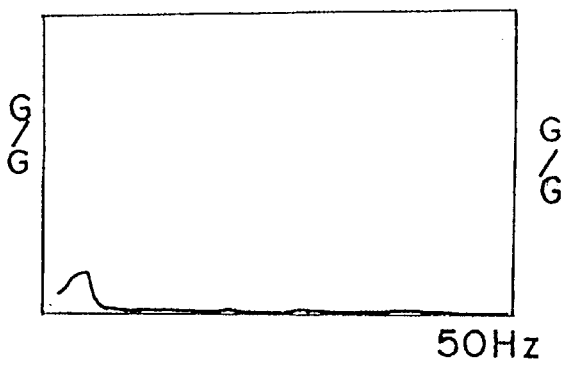
Figure 19F:
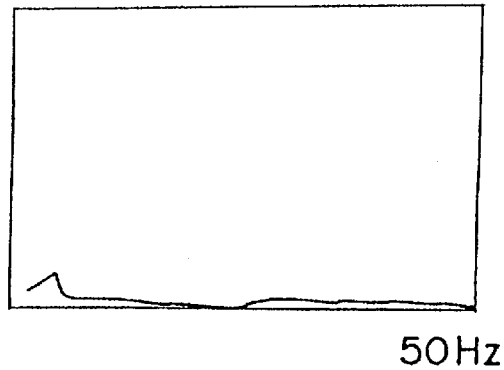

In view of the above, when the dynamic characteristics of only the magnets were investigated using an apparatus of FIG. 18, the results as shown in FIGS. 19 and 20 were obtained.

The apparatus of FIG. 18 has two opposing permanent magnets 2 and 4, the distance of which is changed via X-links 10 without any area conversion.

In FIGS. 19 and 20, the axis of abscissa indicates the frequency (Hz), while the axis of ordinate indicates the vibration transmissibility (G/G). In FIGS. 19(a), (b), (c), (d), (e), and (f) are graphs obtained when the same load of 30 kg was applied with the use of magnets of 50×50×10 mm, 50×50×15 mm, 50×50×20 mm, 75×75×15 mm, 75×75×20 mm, and 75×75×25 mm, respectively. On the other hand, in FIG. 20, different loads of 53 kg and 80 kg were applied with the use of the same magnet of 50×50×20 mm.

FIGS. 19 and 20 indicate the nonlinear characteristics of the magnetic spring and have revealed that when the load is the same, as the opposing area of the magnets increases, the distance between the magnets increases, the resonant point is shifted to a lower frequency region, and the vibration transmissibility becomes smaller. In other words, the magnetic spring behaves in the way opposite to the metal spring or the air spring. On the other hand, when the magnet size is the same, even if the load is changed, the resonant point does not change. When the load is increased, the vibration transmissibility is reduced. In short, the vibration transmissibility at the resonant point depends on the magnitude of the load.

From the above, by utilizing the optimum curvature of the load-deflection curve, it is possible to keep the resonant frequency constant and the low vibration transmissibility small, even if the loaded mass changes, though it is available only in the low frequency region. These are damping effects by the loaded mass m and the spring constant k included in the equations (4), (5), and (6).

FIG. 21 is a graph employed as a comparative example indicating the dynamic characteristics of a conventional automotive seat and reveals that the vibration transmissibility is high as a whole, and both the resonant point and the vibration transmissibility vary with a change of load.

Figure 22:
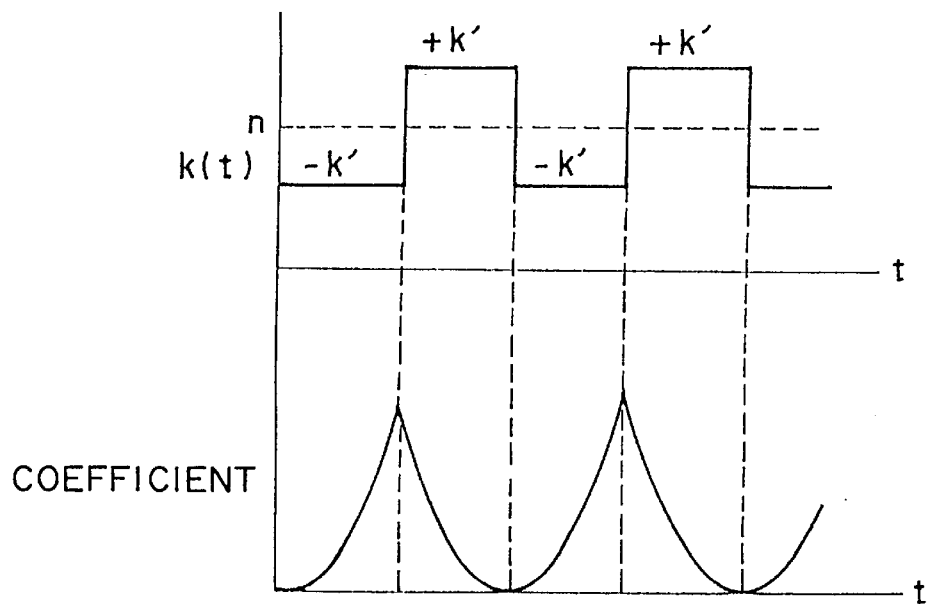
FIG. 22 is a graph showing a change of a spring constant and that of a coefficient relative to time in the magnetic spring structure of the present invention.

In the equation (1), when the geometric dimensions between the opposing permanent magnets are changed by an internal kinetic mechanism (mechanism for moving the permanent magnets within a repulsion system) or by an external force, the spring constant k is a square wave k(t) changing with time, as shown in FIG. 22, and takes a value of +k' or -k' alternately in one half of a period of T=2 π/ω. Accordingly, the equation (1) can be expressed as follows.

$$m\ddot{x} + r\dot{x} + mg - \frac{k(t)}{x} = F(t) \quad (7)$$

(i) When $0 < t < \pi/\omega$, $$m\ddot{x} + r\dot{x} + mg - \frac{n - k'}{x} = F(t)$$

(ii) When $\pi/\omega \le t < 2\pi/\omega$, $$m\ddot{x} + r\dot{x} + mg - \frac{n + k'}{x} = F(t)$$

When b $0 < t < \pi/\omega$ and when the balanced position is represented by $x_0$ and the deflection from the balanced position is represented by $y_1$, $$-\frac{n-k'}{x_0} + mg = 0, \quad x_0 = \frac{n-k'}{mg}$$

$$x = x_0 + y_1$$

$$\dot{x} = \dot{y}_1$$

$$\ddot{x} = \ddot{y}_1$$

$$\frac{n-k'}{x} = \frac{n-k'}{x_0+y_1} = \frac{n-k'}{x_0\left(1+\frac{y_1}{x_0}\right)} \approx \frac{n-k'}{x_0}\left(1-\frac{y_1}{x_0}\right) \quad [\because y_1 \ll x_0]$$

$$= \frac{n-k'}{x_0} - \frac{n-k'}{x_0^2} y_1$$

$$m\ddot{x} + r\dot{x} - \frac{n-k'}{x} + mg = m\ddot{y}_1 + r\dot{y}_1 - \frac{n-k'}{x_0+y_1} + mg$$

$$= m\ddot{y}_1 + r\dot{y}_1 - \frac{n-k'}{x_0} + \frac{n-k'}{x_0^2}y_1 + \frac{n-k'}{x_0}$$

$$= m\ddot{y}_1 + r\dot{y}_1 - \frac{n-k'}{x_0^2} y_1$$

When $(n-k')/x_0^2 = k_1'$, $$m\ddot{y}_1 + r\dot{y}_1 + k_1' y_1 = F(t)$$

When the harmonic excitation $F(t) = Fe^{i\omega t}$ and $y_1 = xe^{i\omega t}$, $$\dot{y}_1 = i\omega x e^{i\omega t}$$

$$\ddot{y}_1 = i^2 \omega^2 x e^{i\omega t}$$

$$-m\omega^2 x e^{i\omega t} + ri\omega x e^{i\omega t} + k_1' x e^{i\omega t} = F e^{i\omega t}$$

$$(-m\omega^2 x + ri\omega x + k_1' x) e^{i\omega t} = F e^{i\omega t}$$

$$x(k_1' - m\omega^2 + ri\omega) = F$$

$$x = \frac{F}{k_1' - m\omega^2 + ri\omega}$$

$$= \frac{F(k_1' - m\omega^2 - ri\omega)}{(k_1' - m\omega^2 + ri\omega)(k_1' - m\omega^2 - ri\omega)}$$

$$= \frac{F}{\sqrt{(k_1' - m\omega^2)^2 + (r\omega)^2}} \left[ \frac{k_1' - m\omega^2}{\sqrt{(k_1' - m\omega^2)^2 + (r\omega)^2}} - ir \frac{\omega}{\sqrt{(k_1' - m\omega^2)^2 + (r\omega)^2}} \right]$$

$$= \frac{F}{\sqrt{(k_1' - m\omega^2)^2 + (r\omega)^2}} (\cos\phi - i\sin\phi)$$

$$= \frac{F}{\sqrt{(k_1' - m\omega^2)^2 + (r\omega)^2}} e^{-i\phi}$$

$$y_1 = xe^{i\omega t} = \frac{F}{\sqrt{(k_1' - m\omega^2)^2 + (r\omega)^2}} e^{i(\omega t - \phi)}$$

$$= \frac{F}{\sqrt{k_1'^2\left[1-\left(\frac{\omega}{\omega_0}\right)^2\right]^2 + \left(2\rho\frac{\omega}{\omega_0}\right)^2}} e^{i(\omega t - \phi)}$$

Here, $\phi$ indicates the phase angle.

$$\rho = r/2\sqrt{mk_1'}$$

$$\omega_o^2 = \frac{k_1'}{m} = \frac{n-k'}{mx_0^2} = \frac{n-k'}{m}\left(\frac{mg}{n-k'}\right)^2 = \frac{m}{n-k'} g^2$$

Accordingly, the resonant frequency is given by:

$$\omega_o \propto \sqrt{\frac{m}{n-k'}}$$

Similarly, when $\pi/\omega \geq t < 2\pi/\omega$, $$y_2 = \frac{F}{\sqrt{k_1'^2\left[1-\left(\frac{\omega}{\omega_o}\right)^2\right]^2 + \left(2\rho\frac{\omega}{\omega_o}\right)^2}} e^{i(\omega t - \phi)}$$

$$k_2' = \frac{n+k'}{x_1^2} \quad \rho = \frac{r}{2\sqrt{m\frac{n+k'}{x_1^2}}}$$

Hence, when $y_1 > y_2$, it diverges.

In general, a self-excited vibration system can be replaced with a spring-mass system having negative damping characteristics, and energy of vibration is introduced thereinto from outside during vibration. The actual vibration, however, loses energy because air resistance or various resistances act on the mass point.

However, if the energy of vibration is introduced as an external force into the magnetic spring having negative damping characteristics, it diverges in the case of $y_1 > y_2$, as described above. If it continues diverging, the amplitude is gradually increased to thereby destroy the system. Otherwise, positive damping is caused to act on the system by adding a damping term, which increases with deflection, to the above characteristic equation. In this case, when the positive damping is balanced with the negative damping, steady-state vibration occurs in the system. In other words, as is the case with the spring constant k(t), the damping coefficient is variable and, hence, the equation (1) can be rewritten as follows.

$$m\ddot{x} + r(x)\dot{x} + mg - \frac{k(t)}{x} = F(t) \qquad (8)$$

The vibration system having the magnetic spring of the present invention includes an energy conversion system inducing continuous oscillation or diverging vibration. Adding a positive damping term to the above characteristic equation results in the following equation.

$$m\ddot{x} + (r_2 x^2 - r)\dot{x} + mg - \frac{k(t)}{x} = F(t) \qquad (9)$$

In this characteristic equation, when $r_2 \neq 0$, three terms on the left side become greater with x, and the term of spring acts as a positive damping term. Accordingly, in the internal exciting characteristics by the permanent magnets, a small deflection causes negative damping, while an increase in deflection results in positive damping, and the vibration become steady at an amplitude where the positive damping and the negative damping are balanced.

In the case where the magnitude of at least one of the mass, damping coefficient, and spring constant in a vibration system changes with time, the vibration caused thereby is referred to as coefficient exciting vibration. Each of the equations (7), (8), and (9) indicates the coefficient exciting vibration in which an exciting source itself vibrates and generates vibration by converting non-vibrating energy within the system to vibratory excitation.

Because supply energy is generally converted from part of dynamic energy, when the dynamic energy has an upper limit, the supply energy is limited, and the amplitude is restrained when this energy becomes equal to energy to be consumed. The potential energy by the permanent magnets is independent of the dynamic energy within the system, and the difference between it and the energy to be consumed can be enlarged. If the maximum energy product per unit mass of the permanent magnets increases, the aforementioned difference can be considerably enlarged. Because of this, vibration energy can be increased by making, in one cycle, the supply energy produced by negative damping greater than the energy consumed by the damping.

As described above, it is possible to freely control the damping coefficient r and the spring constant (coefficient) k in the equation (1). In the schematic diagram of FIG. 1, for example, the amplitude can be attenuated by maximizing the opposing area of the permanent magnets 2 and 4 when the permanent magnet 4 is positioned at its lower end. This feature is applicable to a magnetic brake, dynamic damper or the like. On the other hand, the repulsive force can be increased by maximizing the opposing area when the permanent magnet 4 is moved from its lower end towards it upper end. This feature is applicable to a generator, amplifier or the like.

Furthermore, as can be seen from a solution of the above characteristic equation, the coefficient exciting vibration system according to the present invention can reduce variations in amplitude by moving the exciting frequency even if the natural frequency varies according to variations in load. In other words, the resonant frequency can be reduced by making the exciting frequency variable and causing the resonant frequency to manually or automatically follow it. By applying this feature to a vibration isolator device for an automotive seat, it is possible to enhance the vibration isolating properties and improve the individual performance thereof. For example, it is possible to lower the resonant point to a frequency below 4 Hz. Moreover, the vibration at a low frequency region can be improved by making use of negative damping, while the difference in weight can be absorbed by specializing the nonlinear characteristics of the permanent magnets.

Figure 23:
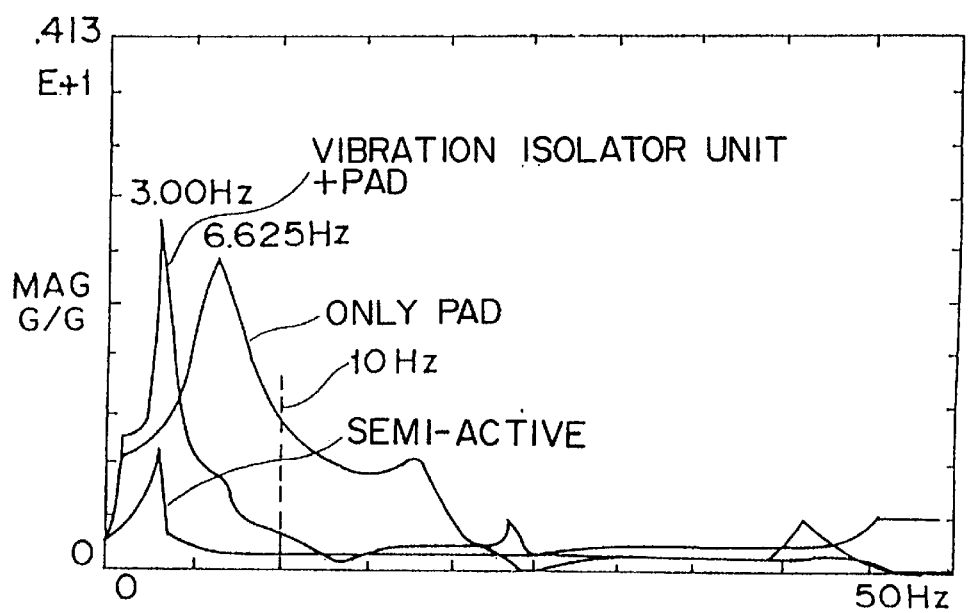
FIG. 23 is a graph showing the dynamic characteristics of a bed-type vibration isolator unit when only pads were used, when the pads and the magnetic spring were used, and when semi-active control was performed.

Several experiments of vibration were conducted using pads having urethane and fibers combined with each other and a bed-type vibration isolator unit employing the magnetic spring structure of the present invention. FIG. 23 depicts the results of the experiments.

As can be seen from the graph shown in FIG. 23, the vibration isolator device employing the magnetic spring structure of the present invention together with the pads was recognized as an extremely effective one because of the fact that it could lower the resonant frequency to 3 Hz which is less than half the resonant frequency of the vibration isolator device employing only the pads. Furthermore, the vibration transmissibility at the resonant point could be reduced to about ⅓ by active-controlling the vibration isolator device.

Figure 24:
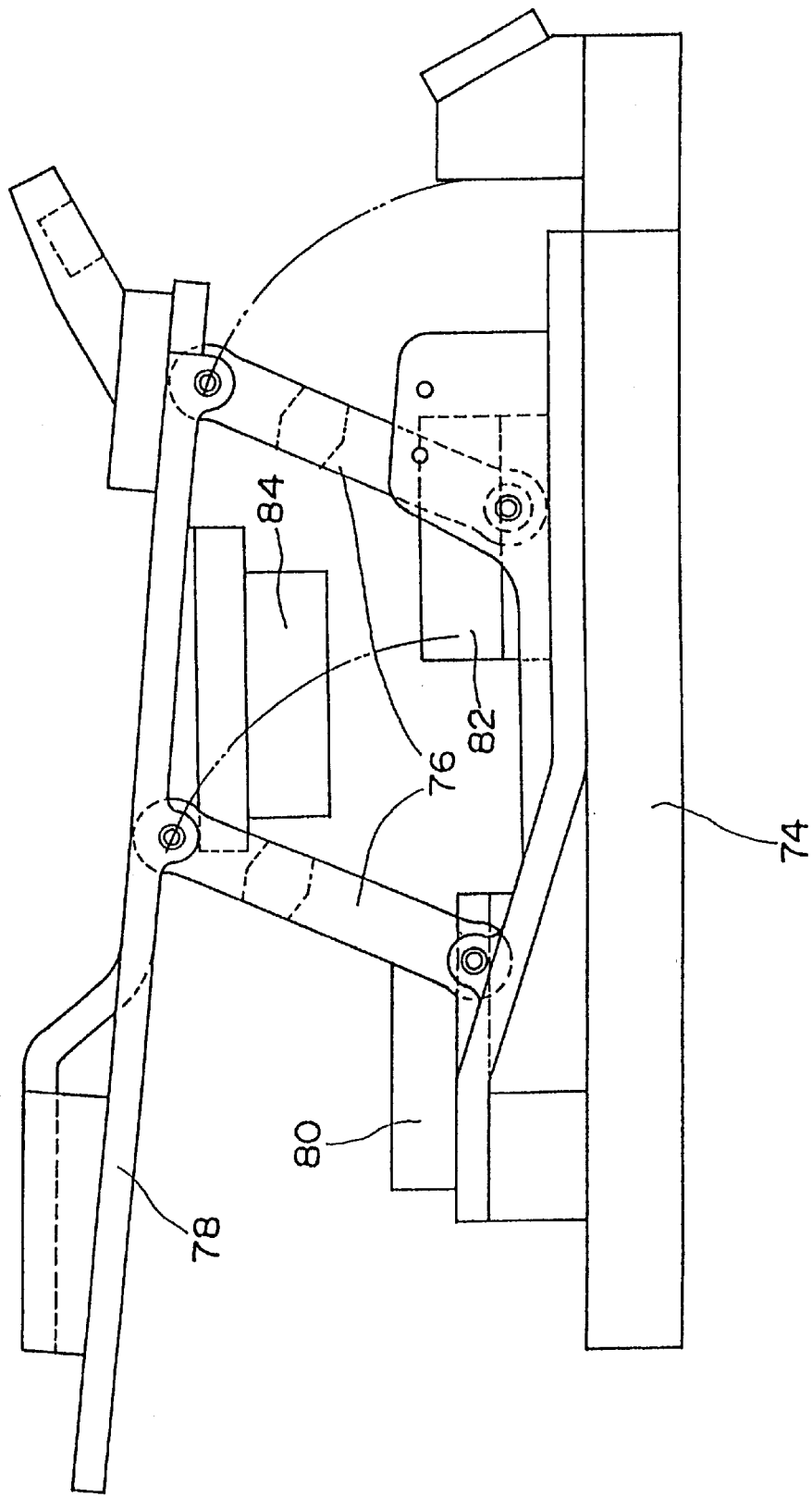
FIG. 24 is a front view of a magnetic levitation unit used to measure the dynamic characteristics of the magnetic spring.

FIG. 24 depicts a magnetic levitation unit. Upon investigation of the dynamic characteristics thereof, the results shown in FIG. 25 could be obtained.

The magnetic levitation unit of FIG. 24 comprises a base 74, a seat 78 swingably mounted on the base 74 via a plurality of swingable levers 76, two permanent magnet 80 and 82 spaced a predetermined distance from each other and fixedly mounted on the upper surface of the base 74, and a permanent magnet 84 fixedly mounted on the lower surface of the seat 78 so that the same magnetic poles may be opposed to each other with respect to the permanent magnet 80 and 82. Each of the permanent magnets has a size of 75×75×25 mm.

Figure 25:
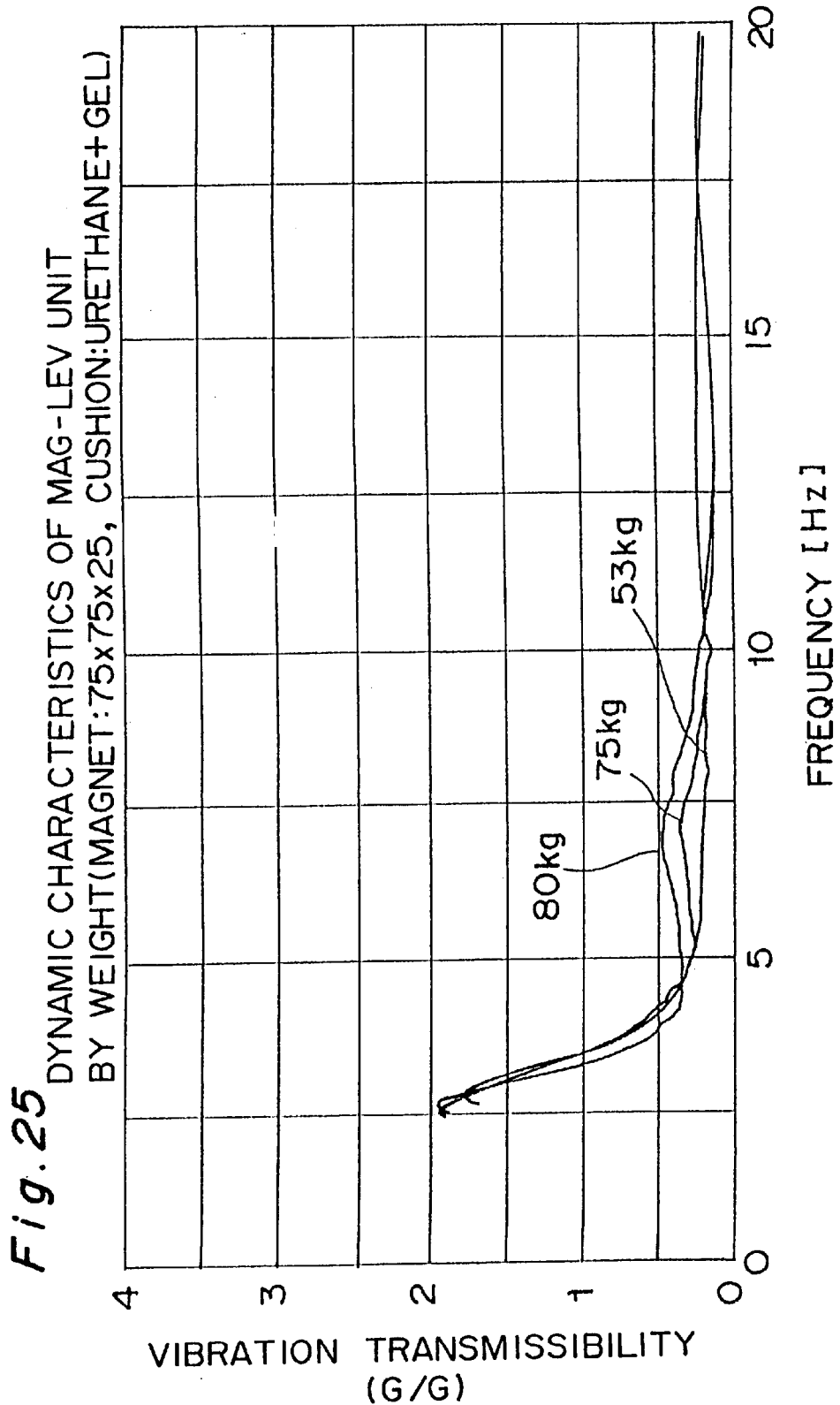
FIG. 25 is a graph showing the dynamic characteristics of the magnetic leviation unit measured by the use of the magnetic levitation unit of FIG. 24.

FIG. 25 is a graph obtained when different loads of 53 kg, 75 kg, and 80 kg were applied to this magnetic levitation unit. As shown therein, not only could the difference in vibration transmissibility caused by variations of the load be limited to be small, but also the resonant point could be made substantially constant.

Figure 26:
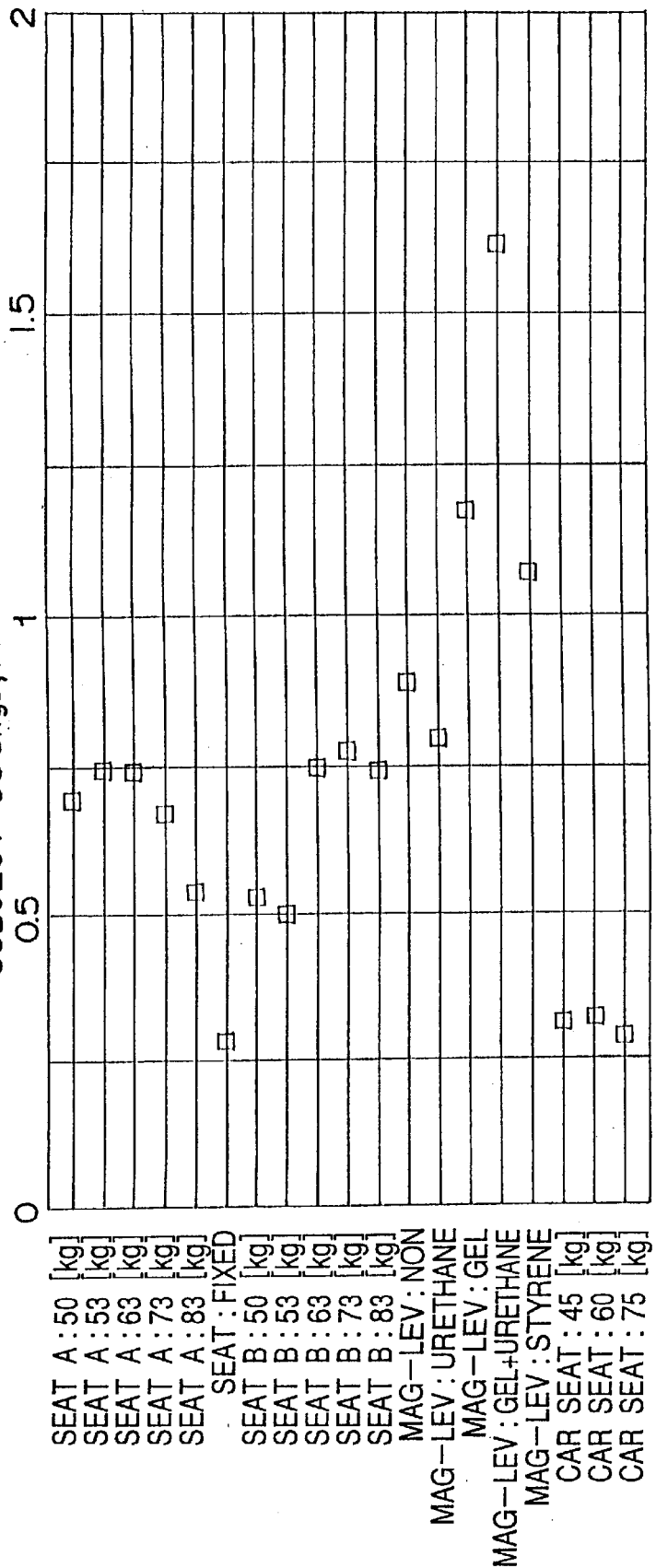
FIG. 26 is a graph showing evaluation values of seat comfort measured by the use of various seats including the magnetic levitation unit.

Furthermore, the seat comfort was investigated using automotive seats, suspension seats A, suspension seats B, and the magnetic levitation unit of the present invention. The results were as shown in FIG. 26. The load applied to the magnetic levitation unit was 53 kg and permanent magnets of 75×75×25 mm were used. In the figure, "fixed" indicates the condition in which the seat was merely fixed on a suspension, and urethane, gel, or styrene is the material of cushion placed on the unit.

The Ride Number R defined in "SAE paper 820309" and given by the following formula was used to evaluate the seat comfort.

$$R = K/(A \cdot B \cdot fn)$$

where variables A, B, and fn can be obtained from the transfer function (T.F.) of the seat and indicate the following values, respectively.

A: the maximum value of T.F.

B: the value of T.F. at 10 Hz fn: the resonant frequency or frequency at which A has appeared K: the coefficient of seat comfort indicative of completely different seats (K-value was set to "1" because various seats were used)

While the ISO comfort evaluation indicates that the smaller numbers are better, the Ride Number R indicates that the larger numbers are better.

As can be seen from FIG. 26, of the seats of which the seat comfort was evaluated, the values obtained in the automotive seats are 0.2–0.3 (all-urethane seats) and 0.3–0.5 (metal spring seats), and those obtained in the suspension seats to which weight adjustments were conducted are 0.5–0.7. On the other hand, the seat comfort of the magnetic levitation unit of the present invention is better than that of other seats, and the evaluation values of seat comfort thereof are 0.75–1.60 with respect to a load of 53 kg.

Figure 27:
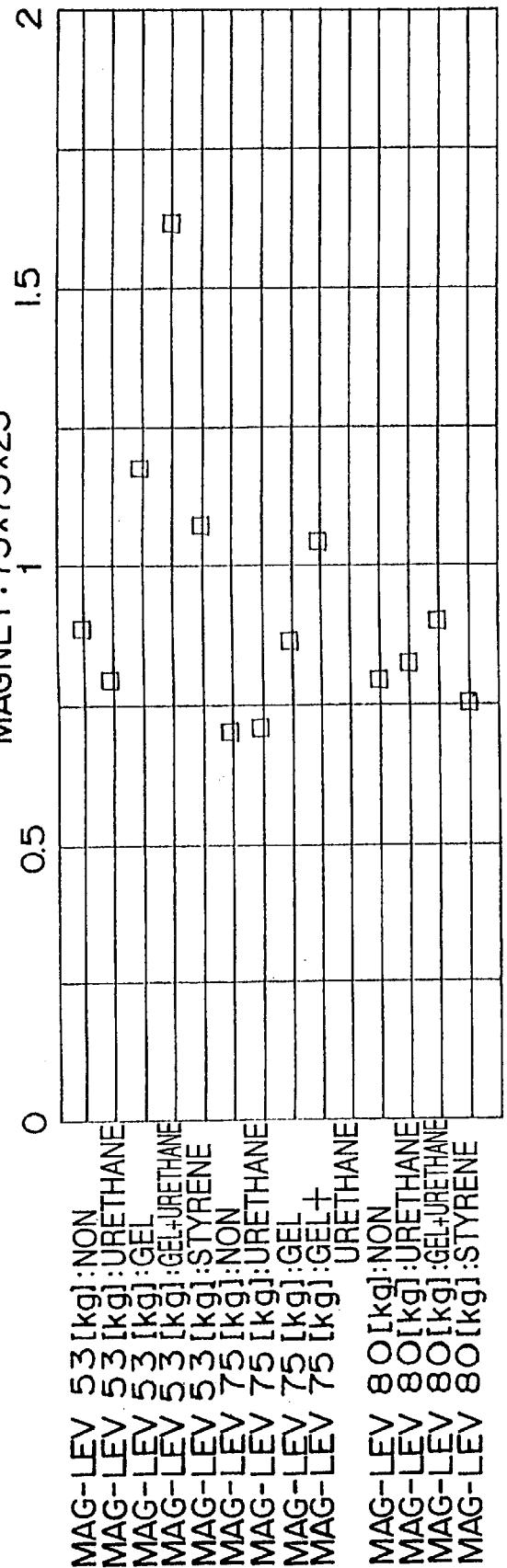
FIG. 27 is a graph showing evaluation values of seat comfort measured by changing the load and the cushion material.

FIG. 27 indicates evaluation values of seat comfort of the magnetic levitation unit when the load applied thereto was changed. As can be seen from this figure, evaluations values of seat comfort more than 0.7 could be obtained with respect to any load, and this fact means that the magnetic levitation unit of the present invention is superior in seat comfort.

Figure 28:
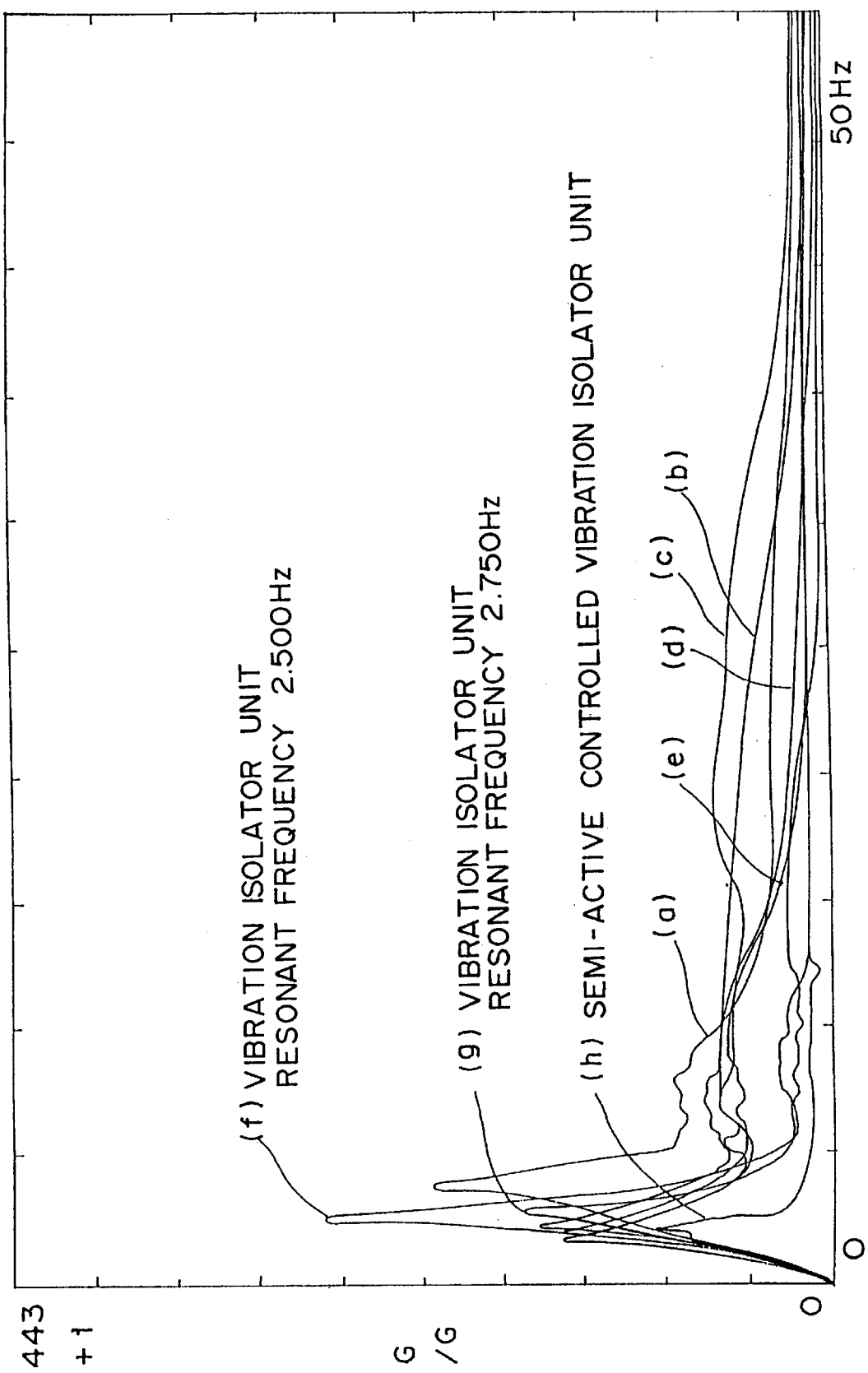
FIG. 28 is a graph showing the dynamic characteristics measured by the use of various seats including the magnetic leviation unit.

FIG. 28 depicts the dynamic characteristics of an automotive seat, suspension seat A, suspension seat B, and the magnetic levitation unit of the present invention. In this figure, (a) indicates the automotive seat, (b) and (c) the suspension seats A to which loads of 53 kg and 75 kg were applied, respectively, (d) and (e) the suspension seats B to which loads of 45 kg and 75 kg were applied, respectively, (f) and (g) the magnetic levitation unit of the present invention having different cushion materials, and (h) the magnetic levitation unit of the present invention that was active-controlled.

As can be seen from FIG. 28, the resonant point of the magnetic levitation unit exists between 2–3 Hz and the vibration transmissibility in low and high frequency regions is small. It was also confirmed that semi-active control thereof could not only further lower the resonant point but also reduce the vibration transmissibility in a wide frequency region.

Collisional vibration can be utilized in the nonlinear vibration system or coefficient exciting vibration system of the present invention.

Collision, as well as friction, is a typical nonlinear phenomenon in mechanical systems and causes something suddenly impeding motion such as, for example, deformation resistance of an object. Accordingly, the object having caused the collision is rapidly decelerated, resulting in generation of a very large acceleration. The magnetic spring also causes the same (quasi-) phenomenon as the collision.

When an object having certain kinetic energy collides against something, the contact area is deformed so that the kinetic energy may be released as plastic deformation work, friction work by the contact surface, a wave motion into the inside of the object, or acoustic energy to the outside. The remainder of the kinetic energy is converted into elastic energy which is in turn converted into kinetic energy. As described above, because the magnetic spring is featured by non-contact, no large loss is caused. In the static characteristics, the output is on the same line as the input and is nonlinear, and negative damping is likely caused.

By way of example, if the magnetic levitation unit causes no end-stop impact, it is accelerated and self-excited by a repulsive force of +α, and exhibits vibration characteristics having no bad influence on human beings, though the vibration is low-damping one because of non-contact. If metal springs are incorporated into the magnetic levitation unit and if the acceleration exceeds damping, it induces a complete elastic collision by the action of hard springs and causes self-excitation to prevent the second resonance. The amount of energy lost can be compensated for by a conversion of potential energy in the magnetic field.

As the fundamental principle for general vibration isolation, it is necessary to take mass effects, vibration isolation, vibration damping, vibration interference, and directivity of propagation into consideration. Because elastic support causes pitching or rolling, the vibration proof foundation should be made heavy and big, and the supporting span should be made long. When damping is caused by the use of both a viscous damper and a frictional damper, such dampers can attenuate deflection by rapidly dispersing energy produced by an impact before the next impact is encountered.

Furthermore, in order to restrain the frictional damping, elastic support of a stopper which causes an end-stop impact can be utilized for vibration isolation and energy conversion, thereby compensating for shortage of the repulsive force of the magnetic spring.

Figure 29:
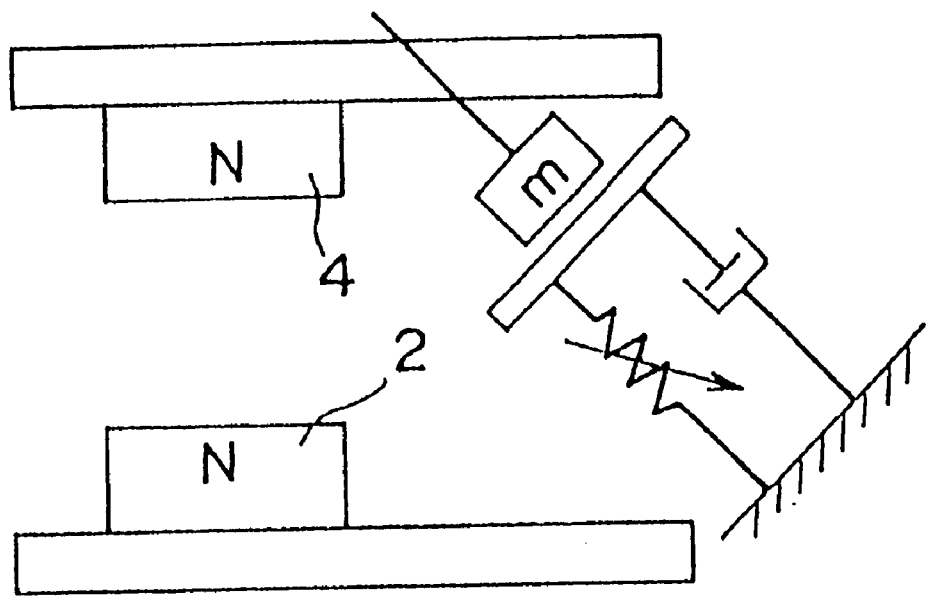
FIG. 29 is a schematic diagram of a magnetic spring model in which a stopper and an elastic support member are incorporated.

FIG. 29 is a model having an elastically supported stopper wherein the spring constant k of an elastic support member can absorb a predetermined acceleration or amplitude and is made variable. The resonant point can be adjusted by appropriately adjusting the spring constant k.

In this construction, when an acceleration or amplitude below a predetermined value is applied to the stopper, an elastic deformation of the elastic support member can restrain the frictional damping and an end-stop impact against the stopper can compensate for shortage of the repulsive force of the magnetic spring and can enhance the vibration isolation ability.

Figure 30:
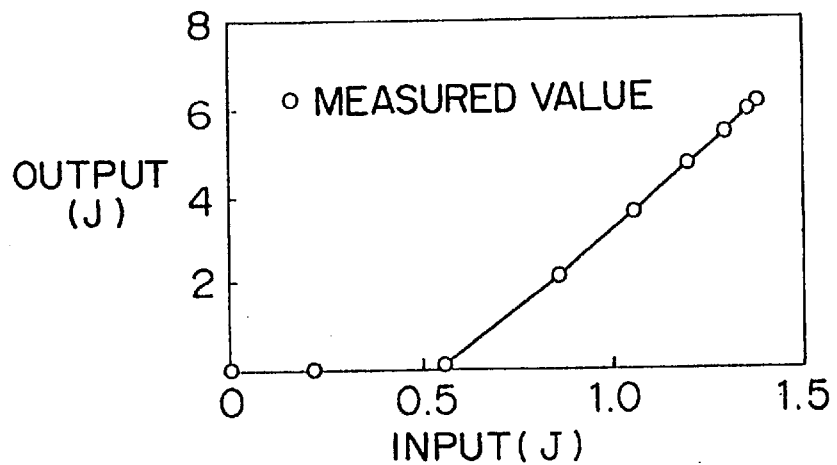
FIG. 30 is a graph showing the input/output work characteristics of a sliding-type principle model.

FIG. 30 shows experimental values of input and output of a sliding-type principle model provided with magnets having an opposing area of $50 \times 25$ mm$^2$ and a thickness of 10 mm, wherein the friction loss was reduced as small as possible. The loaded mass was 3.135 kg.

In the same manner, the case where the sliding type having an area conversion rate of 80% (opposing area: $250 \rightarrow 1250$ mm$^2$) is changed to the rotating type having an area conversion rate of 50% ($625 \rightarrow 1250$ mm$^2$), in which the area conversion is nodlinearly achieved, is described.

Figure 31:
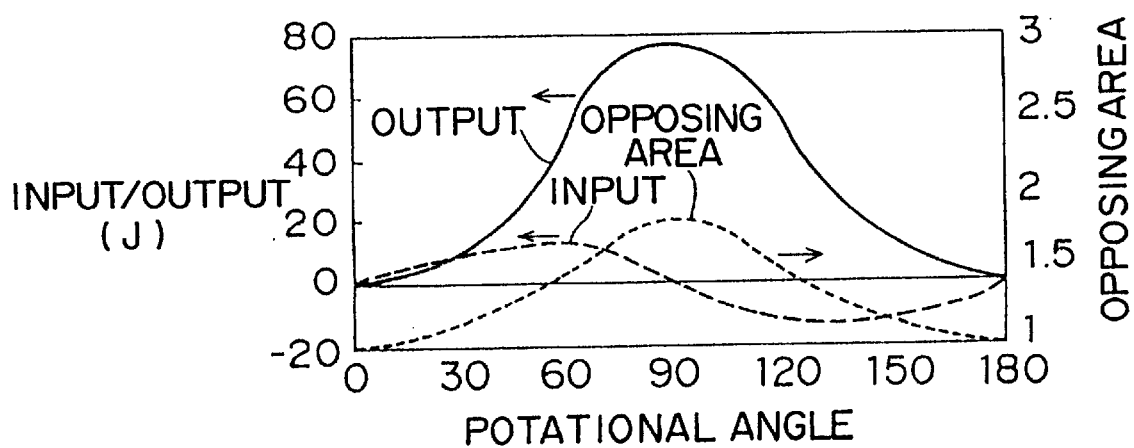
FIG. 31 is a graph showing measured values of input and output of a rotating-type principle model.
Figure 32:
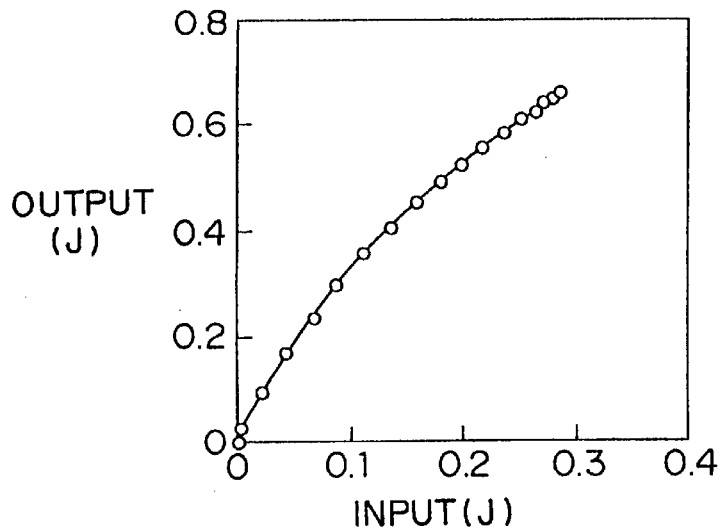
FIG. 32 is a graph showing the input/output work characteristics of the rotating-type principle model.

FIG. 31 shows experimental values of input and output of a rotating-type principle model provided with magnets having an opposing area of $50 \times 25$ mm$^2$ and a thickness of 10 mm, wherein the area conversion is achieved with the center of gravity of one magnet as the center of rotation. FIG. 32 shows experimental values of input and output of the same rotating-type principle model in terms of work.

Figure 33:
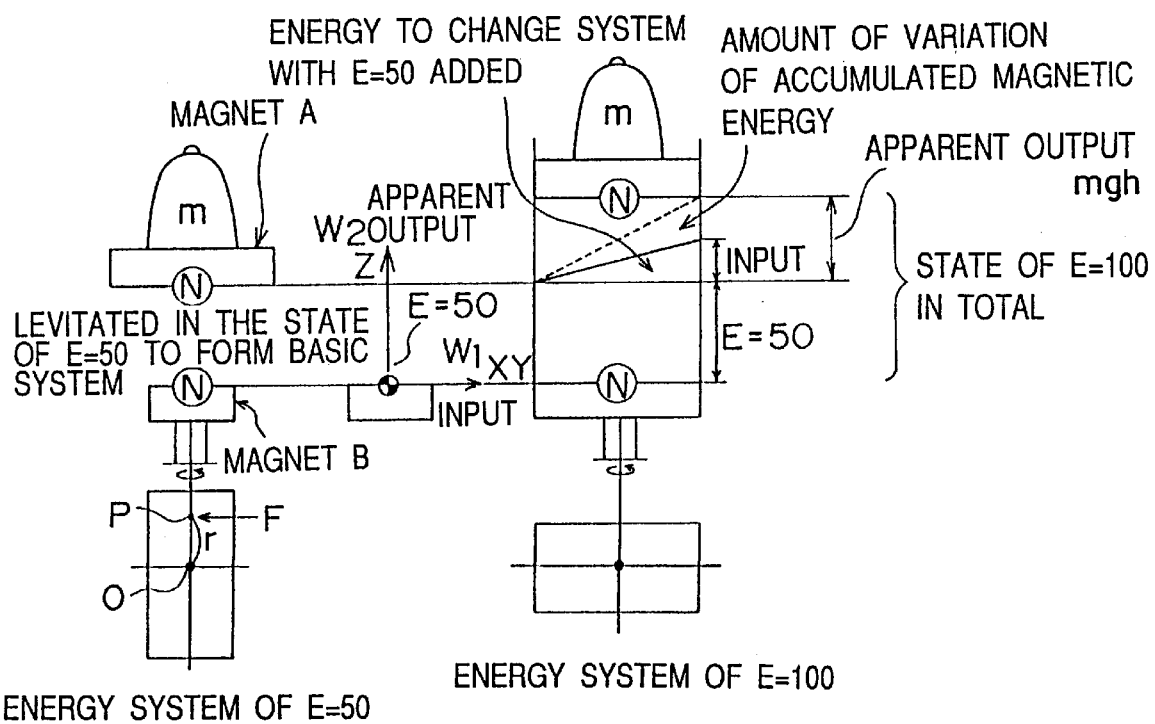
FIG. 33 is a schematic diagram explanatory of the points of an input/output principle model.

In the energy extraction with the use of permanent magnets, energy is apparently produced by increasing the difference of (apparent output/input). FIG. 33 shows the points of a principle model of input and output. Because it is a non-contact system, it is possible to utilize acceleration and produce the greater energy apparently.

The principle of virtual work is applied to the repulsive force acting between magnets, and the amount of variation of accumulated magnetic energy caused by shifting of the magnets is equal to the amount of job caused by shifting of the magnets. The manner in which the magnetic energy is extracted will be the point of a power-redoubling actuator.

The above means that, in order to set permanent magnets, which are in the point at infinity, to the limited position, the work comes to be necessary. Once the magnets are set, it is possible to release the work used for setting the magnets, i.e., the stored magnetic energy, utilize it as output, and amplify the force like an amplifier, by means of, for example, using the conversion of the opposing area of the permanent magnets in the repulsive system as a trigger.

This amplifier can give the same effects as an amplifying transistor by input of electrical energy, and is characterized in that it effectively converts the stored magnetic energy to mechanical energy for subsequent utilization thereof. That is, it produces apparently the greater output (i.e. work) with a small input.

Work W is given by:

$$W = W_g(h) + W_m(h) = mgh + W_m(h)$$

Accordingly, the amount of variation of energy is given by:

$$\Delta W = mg \cdot \Delta h + \Delta W_m(h)$$

$$mg \cdot \Delta h >> \Delta W$$

$$mg \cdot \Delta h - \Delta W = -\Delta W_m(h) > 0$$

$\Delta W_m(h)$ indicates the amount of reduction of the accumulated magnetic energy.

In the case of the rotating-type model, $$-\Delta W_m(h) \approx \Delta W$$

$$mg \cdot \Delta h \approx 2\Delta W$$

Assuming that the distance between the magnets is short and the magnetic flux density is constant, the accumulated magnetic energy can be expressed as:

$$W_m(h) = \tfrac{1}{2} BHV = B^2 Sh/(2\mu_0)$$

where B: magnetic flux density of air gap,

H: magnetic field of air gap,

V: volume of air gap, h: distance of air gap, and

S: cross-sectional area of magnet.

The amount of variation of the accumulated magnetic energy when the magnet shifts by $\Delta h$ can be expressed as:

$$\Delta W_m(h) = B^2 S \Delta h/(2\mu_0)$$

When the repulsive force of the magnets is represented by F, the amount of work caused by shifting can be expressed as $F\Delta h$, and $$\Delta W_m(h) = F\Delta h$$

Then, the repulsive force F can be expressed as:

$$F = B^2 S / (2\mu_0) \ [N]$$

Figure 34:
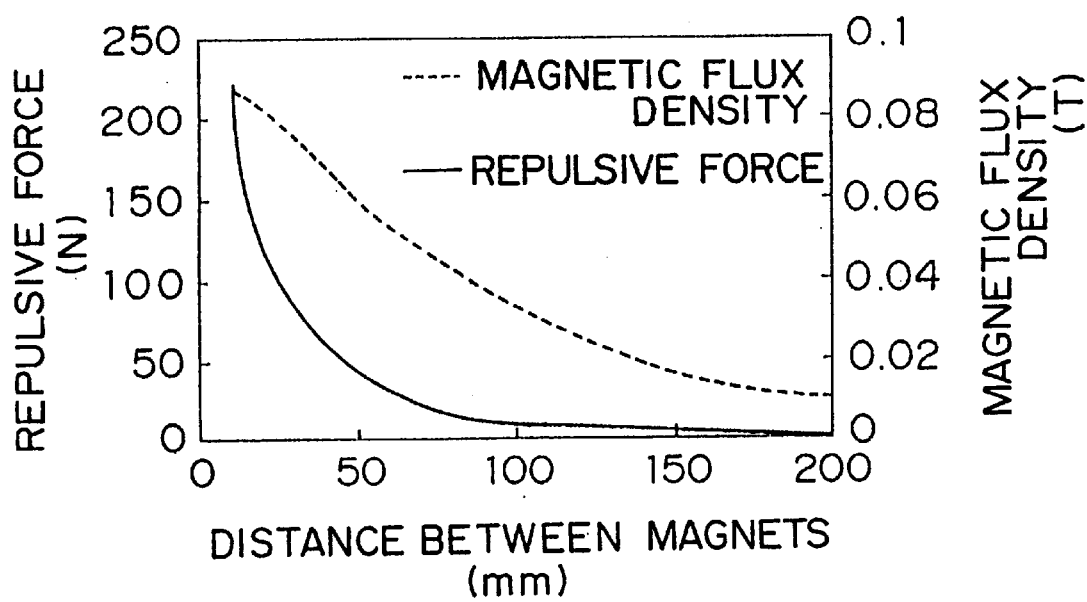
FIG. 34 is a graph showing a relationship between the distance between the magnets and the repulsive force or the magnetic flux density, that was obtained by the use of a charge model.

From the calculation using a charge model of Br=1.0T, an opposing area of 100×100 mm², and a thickness of 10 mm, FIG. 34 could be obtained.

Figure 35:
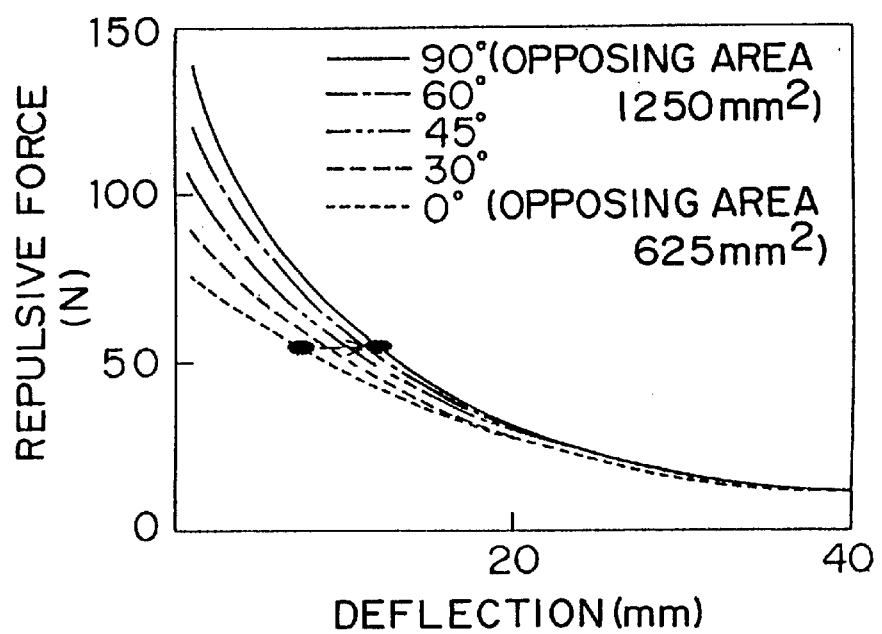
FIG. 35 is a graph showing a relationship between the deflection and repulsive force of the rotating-type principle model obtained by an area conversion.

FIG. 35 indicates a change in repulsive force wherein magnets having an opposing area of 50×25 mm² and a thickness of 10 mm were used.

Similarly, a metal spring model is described.

Figure 36:
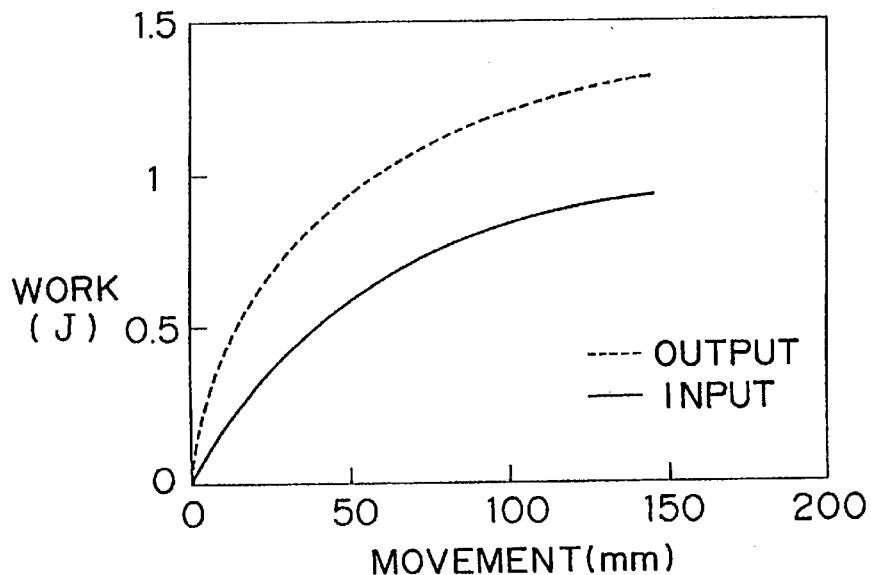
FIG. 36 is a graph showing the input/output work characteristics of a sliding-type metal spring model.
Figure 37:
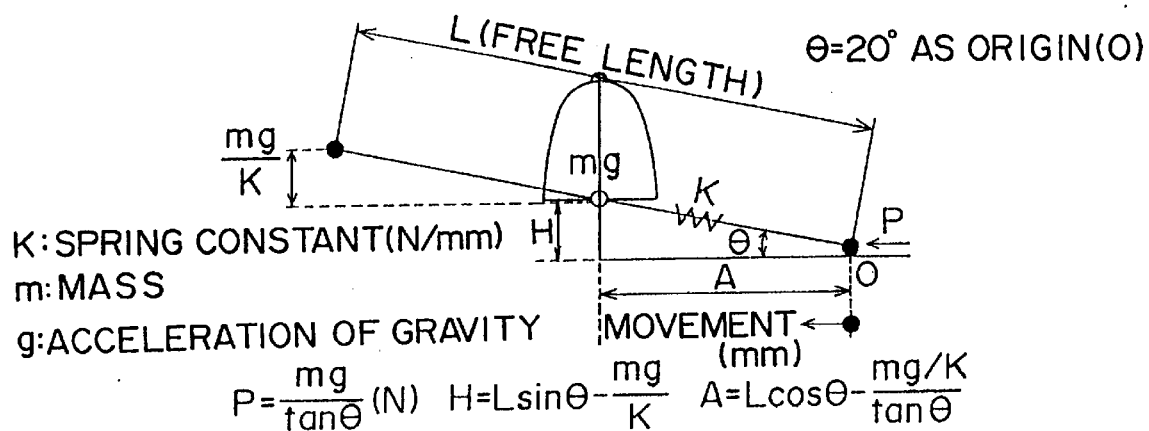
FIG. 37 is a schematic diagram explanatory of the points of the metal spring model.

FIG. 36 shows calculated values in the ideal state with the friction of 0 and no mechanical deflection when setting that mg=10N, k=1N/mm, and L=200 mm.

Figure 38:
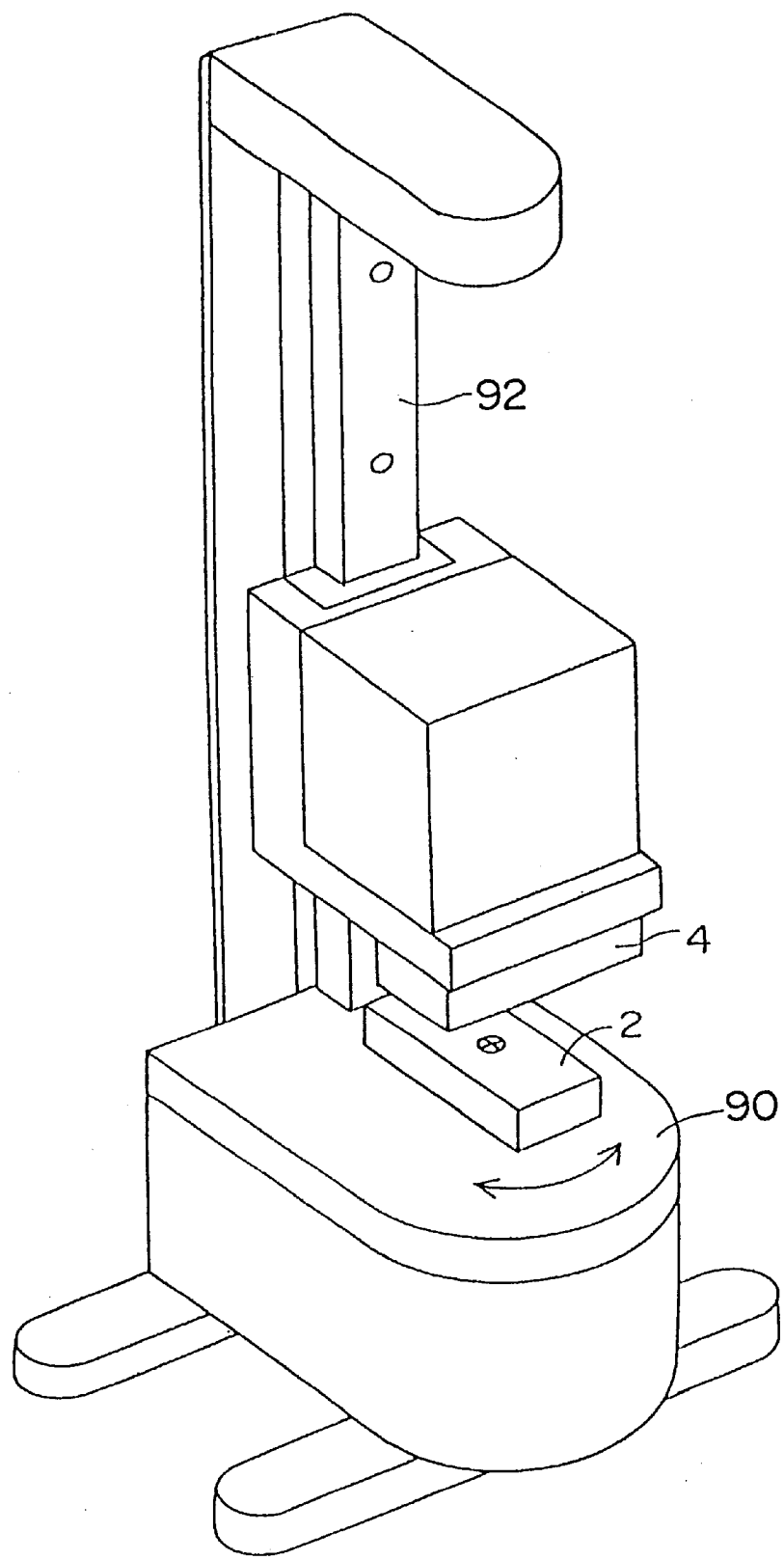
FIG. 38 is a perspective view of the rotating-type principle model.

Statically, metal springs, air springs, and magnetic springs show the same tendencies. However, the magnetically floating pair is to be a pair of lower level than the current mechanical pair. Moreover, considering the nonlinearity and the profitability of acceleration, the great differences, including the efficiency, will arise. FIG. 38 illustrates a rotating-type principle model, while FIG. 39 does a sliding-type principle model.

In the rotating-type principle model of FIG. 38, a lower permanent magnet 2 is rotatably mounted on a base 90, while an upper permanent magnet 4 is vertically slidably mounted on a slider 92. Accordingly, the two opposing permanent magnets 2 and 4 exhibit load-deflection characteristics as shown in FIG. 35 by changing the distance therebetween or the opposing area thereof.

Figure 39:
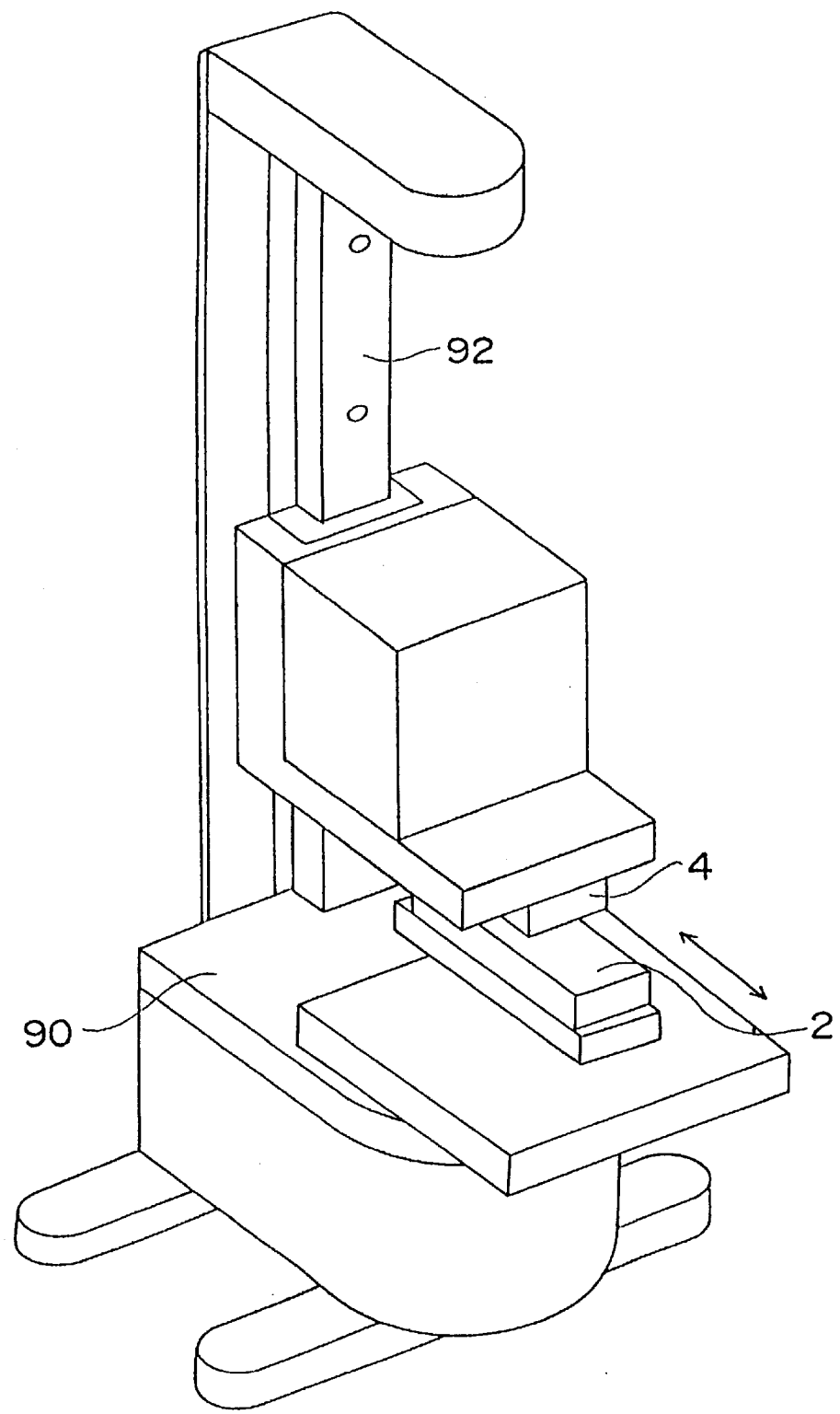
FIG. 39 is a perspective view of the sliding-type principle model.

On the other hand, in the sliding-type principle model of FIG. 39, a lower permanent magnet 2 is horizontally slidably mounted on a base 90, while an upper permanent magnet 4 is vertically slidably mounted on a slider 92. Accordingly, the two opposing permanent magnets 2 and 4 exhibit input-output work characteristics as shown in FIG. 36 by changing the distance therebetween or the opposing area thereof.

Figure 40:
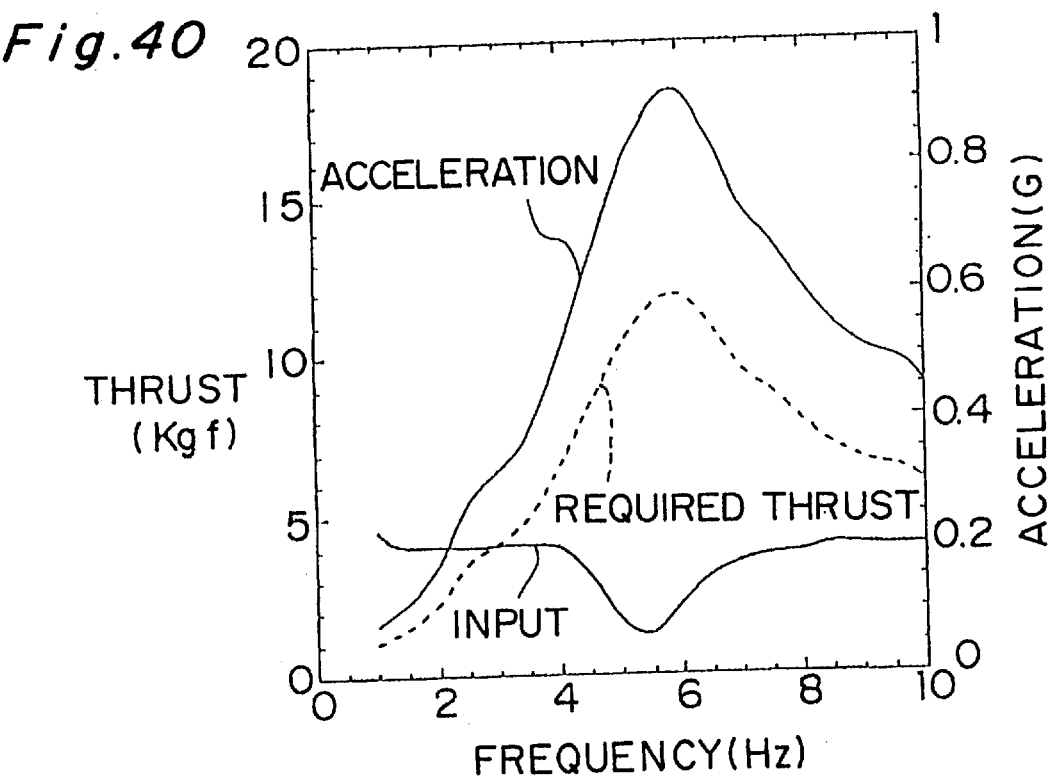
FIG. 40 is a graph showing a relationship between the acceleration and the input or required thrust when the magnetic spring model of FIG. 11 is provided with a balance weight and when the former is provided with no balance weight.
Figure 41:
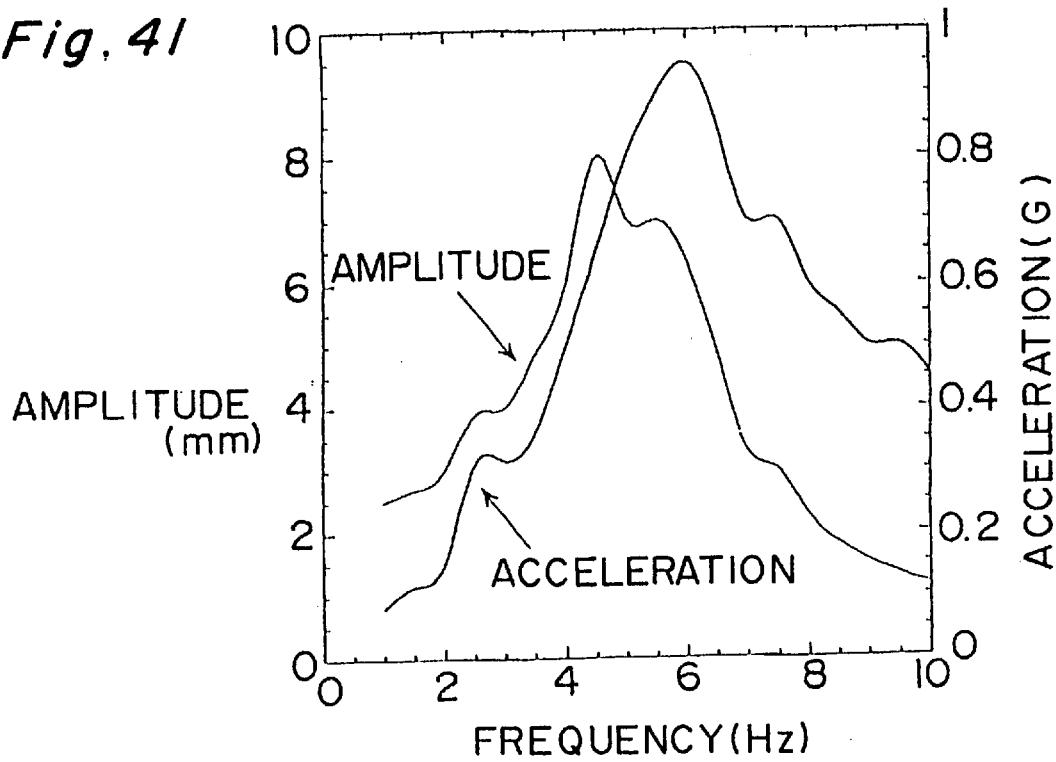
FIG. 41 is a graph showing a relationship of the amplitude and acceleration relative to the frequency when the magnetic spring model of FIG. 11 is provided with a balance weight and when the former is provided with no balance weight.

Upon investigation of the characteristics of the magnetic spring model of FIG. 11 as an exciter or driver, the results as shown in FIGS. 40 and 41 could be obtained.

More specifically, in the magnetic spring model of FIG. 11, a thrust indicated by a dotted line was required to obtain an acceleration shown in FIG. 40 under the condition in which the magnet platform 18, L-shaped lever 22, and balance weight 24 were removed. On the other hand, in the magnetic spring model of FIG. 11 in which the magnet platform 18, L-shaped lever 22, and balance weight 24 were incorporated with the position of the balance weight 24 adjusted, the above acceleration could be obtained by an input shown by a solid line, and a large acceleration (0.9–1.0 G) could be produced by a minimum input at a frequency of 5.5 Hz. Also, the amplitude could be considerably amplified, as shown in FIG. 41.

In other words, large acceleration and amplitude can be obtained with a small driving force (input) by changing the geometric dimensions such as the opposing area or the like of the permanent magnets in the repulsion system to utilize the resonant frequency of the magnetic spring. In the magnetic spring model of FIG. 11, the amount of gap and the opposing area are variables. For example, if a change in the amount of gap is followed by an appropriate change in the opposing area of the two permanent magnets 2 and 4 caused by the balance weight 24, the magnetic spring can have an appropriate spring constant at an arbitrary resonant point.

Figure 42A:
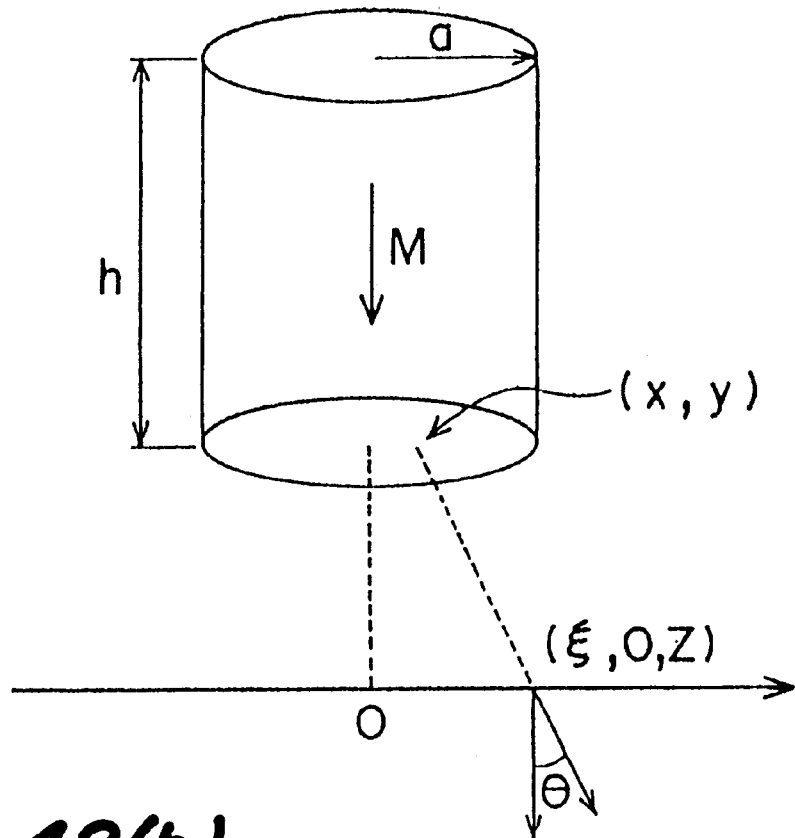
FIGS. 42(a), 42(b) and 42(c) are schematic diagrams of a magnetic field model within a metal conductor, FIG. 42(a) showing the coordinates of a columnar magnet and the metal conductor, FIG. 42(b) showing the circular cylindrical coordinates of the columnar magnet, and FIG. 42(c) showing the current density within the metal conductor.

In order to give the damping characteristics, the application of the magnetic force produced by electromagnetic induction is considered. The magnetic field within a metal conductor is first described with reference to FIG. 42. FIG. 42(a) indicates the coordinates of a columnar magnet and the metal conductor, FIG. 42(b) the circular cylindrical coordinates of the columnar magnet, and FIG. 42(c) the current density within the metal conductor.

As shown in FIG. 42(a), the magnetic field $dH^L$ made at an arbitrary point ($\xi$, 0, z) within the conductor by an arbitrary point (x, y) on the lower surface of the columnar magnet having a radius of (a) and a magnetization of M can be expressed as:

$$dH^L = \frac{1}{4\pi\mu_0} \cdot \frac{M\,ds}{(\xi-x)^2 + y^2 + z^2}$$

where ds is an extremely small area including the point (x, y).

The z component is expressed as:

$$\cos\theta = \frac{z}{\sqrt{(\xi-x)^2 + y^2 + z^2}}$$

$$dH_z^L = \frac{1}{4\pi\mu_0} \cdot \frac{Mz\,ds}{\{(\xi-x)^2 + y^2 + z^2\}^{\frac{3}{2}}}$$

Figure 42B:
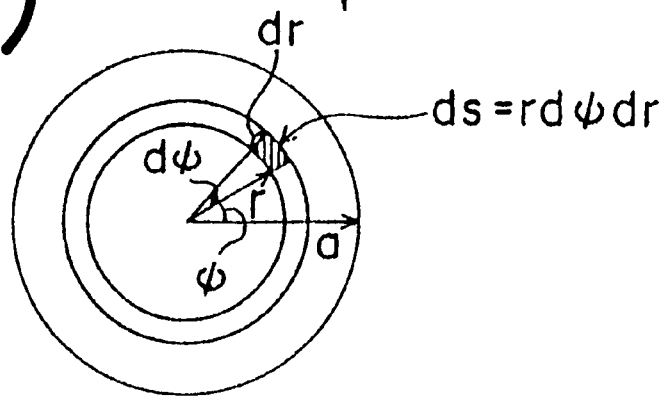

When the circular cylindrical coordinates as shown in FIG. 42(b) are used, x=r·cos(φ)·y=r·sin(φ)ds=rdφdr and, hence, $$H_z^L(\xi, 0, z) = \frac{zM}{2\pi\mu_0} \int_0^a dr \int_0^\pi \frac{r\,d\varphi}{\{(\xi - r\cos\varphi)^2 + r^2\sin^2\varphi + z^2\}^{\frac{3}{2}}}$$

When the thickness of the magnets is represented by h, the magnetic field $H_z^u$ made by the upper surface is given by:

$$H_z^u(\xi, 0, t) = \frac{-(z+h)M}{2\pi\mu_0} \int_0^a dr \int_0^\pi \frac{r\,d\varphi}{\{(\xi - r\cos\varphi)^2 + r^2\sin^2\varphi + (z+h)^2\}^{\frac{3}{2}}}$$

Then, the vertical component $H_z(\xi, 0, z)$ of the magnetic field at ($\xi$, 0, z) within the conductor can be given by:

$$H_z(\xi, 0, z) = H_z^L(\xi, 0, z) + H_z^u(\xi, 0, z)$$

Secondly, the induced current within the conductor is described. When the magnets approach each other, the downward (i.e. the direction to Z) magnetic flux increases, and the electromotive force (e) arises to prevent it.

$$rot\vec{E} = -\frac{\partial \vec{B}}{\partial t} \tag{10}$$

$$\int_s rot\vec{E} \cdot dS = -\frac{d}{dt}\int_s \vec{B} \cdot ds$$

$$\int_s rot\vec{E} \cdot dS = \oint_c \vec{E} \cdot d\varphi = e$$

$$-\frac{d}{dt}\int_s \vec{B} \cdot ds = -\frac{d}{dt}\Phi$$

$$\therefore |e| = \frac{d}{dt}\Phi(R, z) = \frac{\Delta\Phi(R, z)}{\Delta t}$$

where Φ(R, z) represents the magnetic flux within the area surrounded by the radius R of the conductor. If the velocity of approaching is represented by v, $$v = -dz/dt = -\Delta z/\Delta t \therefore \Delta t = \Delta z/|v|$$

From the equation (10), the voltage V along the circumference R is given by:

$$V = |e| = v\cdot\Delta\Phi(R, z)/\Delta z = v\cdot d\Phi(R, z)/dz \tag{11}$$

The magnetic flux $\Phi(R, z)$ is determined as follows.

Figure 42C:
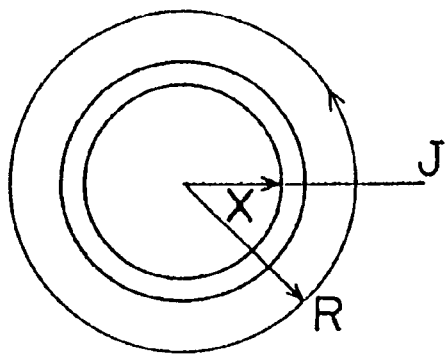

As shown in FIG. 42(c), the magnetic flux in the portion surrounded by the circumference of a radius of $\xi$ and the circumference of a radius of $\xi+d\xi$ is given by $H_z(\xi, 0, z)$ and the area thereof is $2\pi\xi \cdot d\xi$. Accordingly, $$\Delta\Phi(\xi, z) = \mu_0 H_z(\xi, 0, z) \cdot 2\pi\xi \cdot d\xi$$

$$\therefore \Phi(\xi, z) = \int_0^R \mu_0 H_z(\xi, 0, z) \cdot 2\pi\xi \cdot d\xi$$

When the electrical resistance coefficient is represented by $\rho$, the voltage V, the electric current I, the cross-sectional area of circuit S, and the length of circuit $d=2\pi R$, the current density J is given by:

$$J(R, z) = I/s = V/(\rho d) = V/(2\pi R \cdot \rho) \tag{12}$$

When the equation (11) is substituted for the equation (12), the following equation can be obtained:

$$J(R, z) = v/(2\pi R \cdot \rho) \cdot d\Phi(R, z)/dz \tag{13}$$

Thirdly, the interaction energy of the magnet and the conductor is described. By a change of the magnetic flux, the current energy increased within the conductor, i.e., the magnetic energy density $u_m$ is given by:

$$u_m(R, z) = \int_0^{J(R,z)} \Phi(R, z) dJ = \frac{1}{2} J(R, z) \cdot \Phi(R, z) \tag{14}$$

The force exerted on the current density J is given by:

$$f_z(R, z) = \partial u_m(R, z)/\partial z$$

Therefore, $F_z(R)$ exerted on the whole current I(R) of a radius of R is given by:

$$F_z(R) = \int_{z_1}^{z_2} \frac{d u_m(R, z)}{dz} dz = u_m(R, z_2) - u_m(R, z_1) \tag{15}$$

where $z_1$ and $z_2$ represent the distance from the lower surface of the magnet to the upper surface of the conductor and that to the lower surface of the conductor, respectively.

From the equations (13), (14) and (15), $$F_z(R) = \frac{v}{4\pi\rho} \cdot \frac{1}{R} \left\{ \Phi(R, z_2) \frac{d\Phi(R, z_2)}{dz_2} - \Phi(R, z_1) \frac{d\Phi(R, z_1)}{dz_1} \right\}$$

The force exerted on the whole is given by:

$$F_z = \int_0^\infty F_z(R) dR$$

$$F_z = \frac{v}{4\pi\rho} \int_0^\infty \left\{ \Phi(R, z_2) \frac{d\Phi(R, z_2)}{dz_2} - \Phi(R, z_1) \frac{d\Phi(R, z_1)}{dz_1} \right\} dR$$

where $\Phi(R, z)$ represents the magnetic flux within the area surrounded by a radius of R within the conductor, $z_1$ and $z_2$ represent the coordinates at the upper and lower surfaces of the conductor, respectively, and $F_z$ depends on the thickness $T = z_2 - z_1$ of the conductor.

Figure 43A:
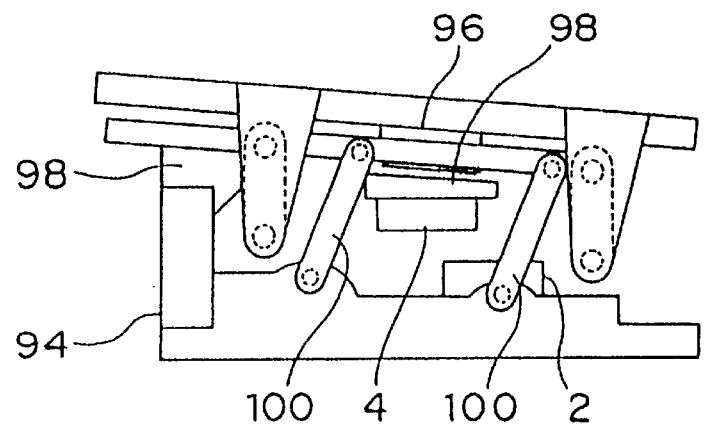
FIGS. 43(a), 43(b) and 43(c) are views of a vibration isolator device for suspension seats in which the magnetic spring of the present invention is incorporated, FIG. 43(a) being a front view of the entire vibration isolator device, FIG. 43(b) a side thereof, and FIG. 43(c) a perspective view of a horizontal vibration isolator unit swingably mounted on an upper portion of the vibration isolator device of FIG. 43(a)
Figure 43B:
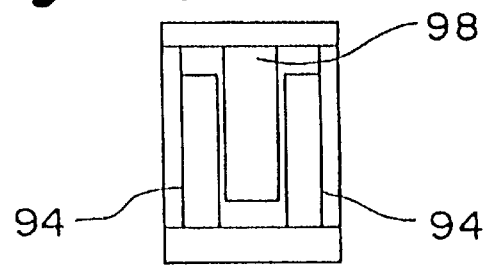
Figure 43C:
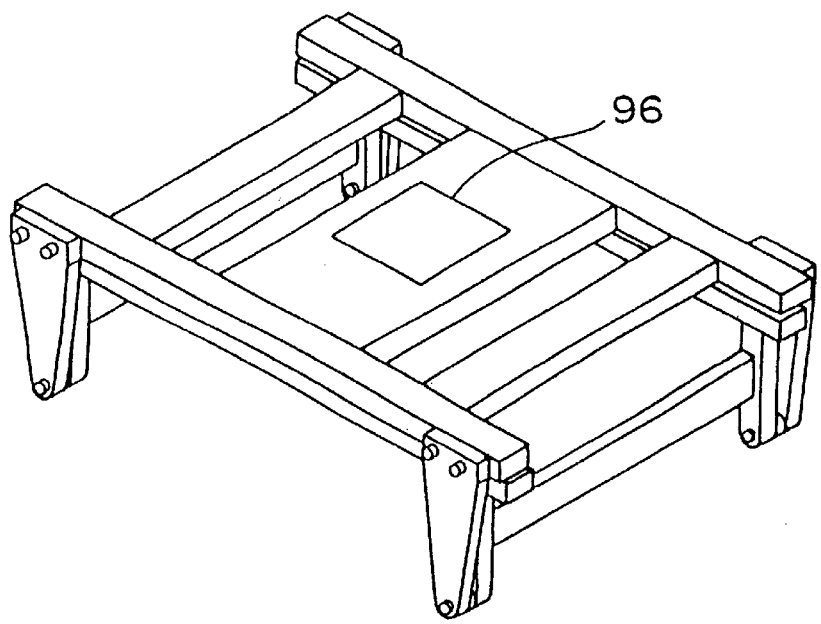

FIG. 43 depicts an embodiment applied to a vibration isolator device for suspension seats, wherein FIG. 43(a) shows the entire vibration isolator device, FIG. 43(b) is a side view of the vibration isolator device of FIG. 43(a), particularly showing a vertical damping structure, and FIG. 43(c) shows a horizontal vibration isolator unit swingably mounted on an upper portion of the vibration isolator device of FIG. 43(a). In the figure, 2, 4, 94, and 96 denote permanent magnets, while 98 denotes a copper plate employed as a conductor.

In this vibration isolator device, the vertical spring properties are obtained by a repulsive system comprised of the permanent magnets 2 and 4 and supported by parallel links 100 and 100. The vertical and horizontal damping structures in which damping is caused by electromagnetic induction are removable from each other. The damping force by electromagnetic induction can be changed by changing the thickness of the copper plate 98.

Figure 44:
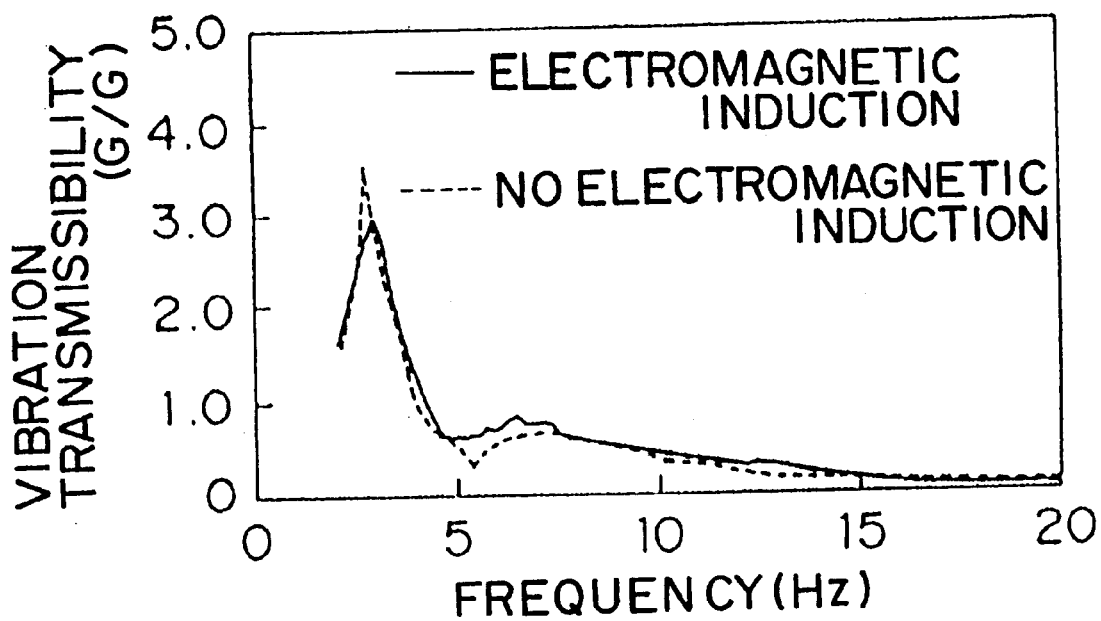
FIG. 44 is a graph showing the vibration characteristics in the presence or absence of the horizontal damping effect caused by electromagnetic induction.

FIG. 44 is a graph showing the comparison of vibration characteristics in the presence or absence of horizontal damping effect. The vibration transmissibility in a low frequency region is restrained to some extent by electromagnetic induction.

According to the magnetic spring structure of the present invention, because repulsive magnetic poles are opposed to each other, the magnets can be regarded as being positioned within a demagnetic field and, hence, there may be a worry about causing the demagnetization during use. As a countermeasure against demagnetization, a dummy-magnetic-leakage structure in which different poles are alternately arranged can reduce the demagnetic field.

In this construction, a leakage magnetic field is created between the magnetic poles equivalent to magnetic walls. When the opposing magnets approach each other, the greater repulsive force can be obtained. Accordingly, the repulsive force, as a function of the distance between the opposing magnets, depends on the number of alternately arranged magnets. This phenomenon is illustrated in FIG. 45.

FIG. 45(a) depicts a magnet arrangement of single pole, FIG. 45(b) that of two poles, FIG. 45(c) that of three poles, and FIG. 45(d) that of four poles. FIG. 45(e) is a figure as viewed from the direction of an arrow in the magnet arrangement FIG. 45(d) of four poles. Although the opposing area (75×75 mm$^2$), volume 75×75×25 mm$^3$) and Br-value (11.7 KG) are the same, the Permeance coefficient differs as follows.

Permeance Coefficient
(a) 0.10
(b) 0.37
(c) 0.54
(d) 0.49

Figure 46:
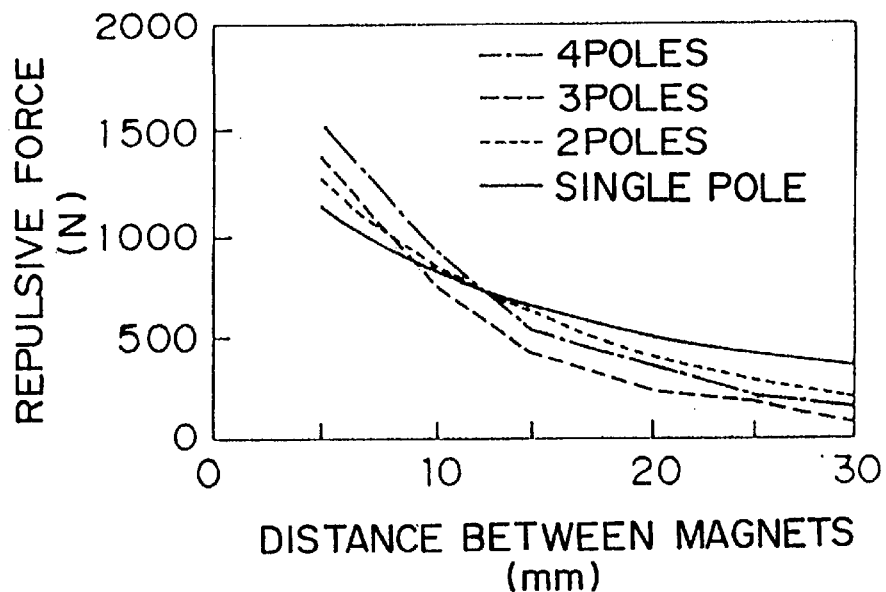
FIG. 46 is a graph showing a relationship between the repulsive force and the distance between the magnets by the number of poles.

FIG. 46 is a graph showing a relationship between the distance of the magnets and the repulsive force in the magnet arrangements of (a) to (d). As can be seen from this graph, when the opposing magnets approach each other, the repulsive force increases with the number of magnetic poles because a leakage magnetic field is created between the magnetic poles equivalent to magnetic walls, as described above.

Figure 47:
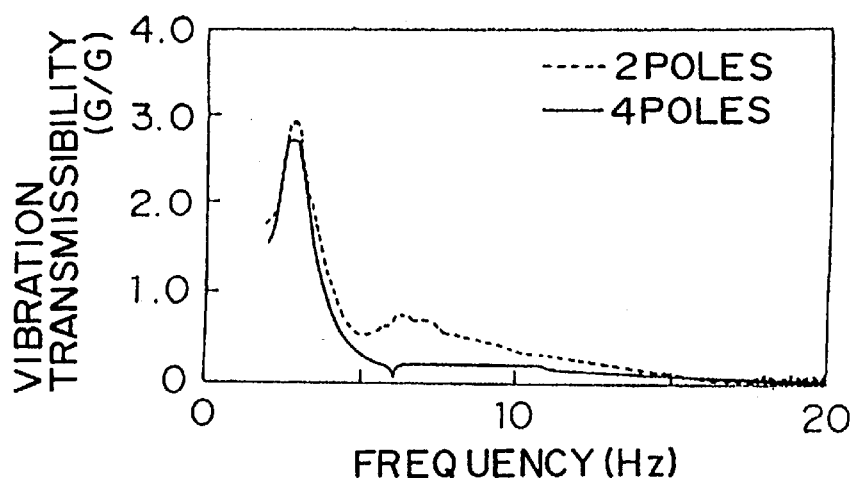
FIG. 47 is a graph showing the vibration characteristics of a vibration isolator device for suspension seats in which a two-pole or four-pole magnetic spring is incorporated.

When the vibration characteristics of four poles and two poles were compared, using a vibration isolator device for suspension seats, the results as shown in FIG. 47 were obtained. As can be seen from this graph, the magnet arrangement of four poles has a damping effect caused by the attractive force and can reduce the vibration transmissibility at the band of the resonant frequency of internal organs and vertebral column. As the exciting condition, a LOG-SWEEP sinusoidal wave with a constant acceleration of 0.3 G was used, and the loaded mass was set to 53 kg.

Conventionally, k around the balanced point, usually used for automotive seats, is between 10–30N/mm. Therefore, when the loaded mass increases, the conventional automotive seats are apt to cause end-stop. In contrast, when the loaded mass decreases, the resonant frequency shifts to resonate internal organs or vertebral column, or the vibration transmissibility increases. For this reason, urethane foam having a damping function is used in a pad layer, while a soft spring-rich structure is obtained by the use of metal springs. Furthermore, a shock absorber is used to increase the damping function. In the automotive seats, the vibration isolating characteristics, the damping characteristics, the body pressure, and the posture stability are balanced using such various functional elements.

It is, however, said to be difficult not only to reduce the vibration transmissibility to less than 1.0 G/G at a low frequency region of 2–3.5 Hz, but also to remove the second resonance and the extremely soft feeling at a high frequency region.

Figure 48A:
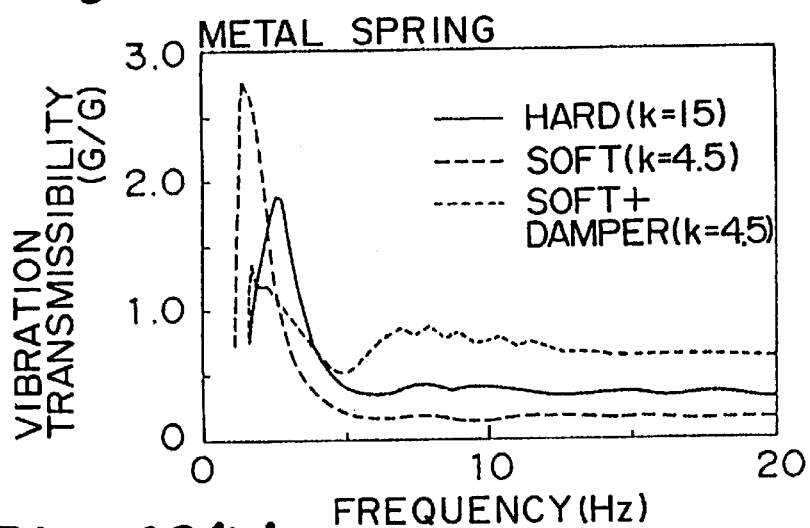
FIGS. 48(a), 48(b) and 48(c) are graphs showing the vibration characteristics of various springs, FIG. 48(a) showing the vibration characteristics of a metal spring, FIG. 48(b) the vibration characteristics of an air spring, and FIG. 48(c) the vibration characteristics of a magnetic spring.
Figure 48B:
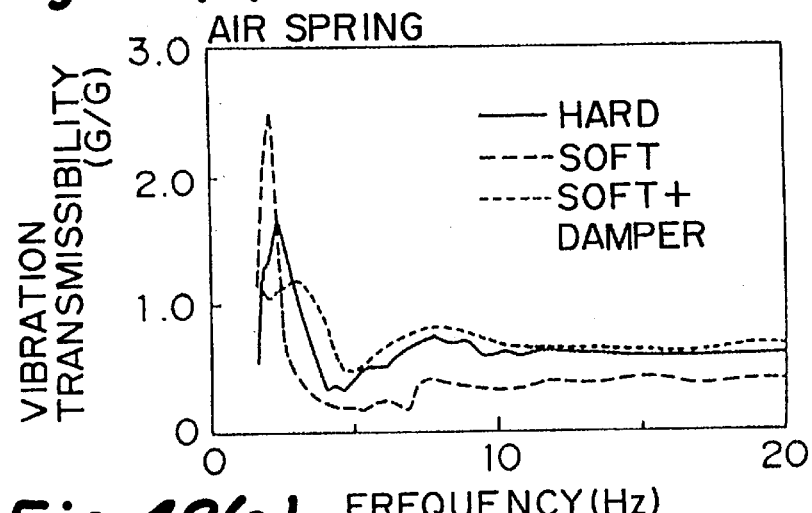
Figure 48C:
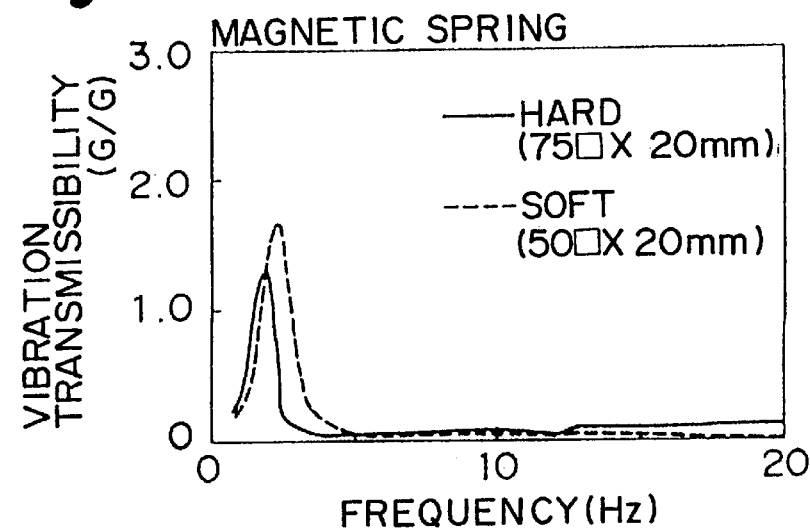
Figure 49:
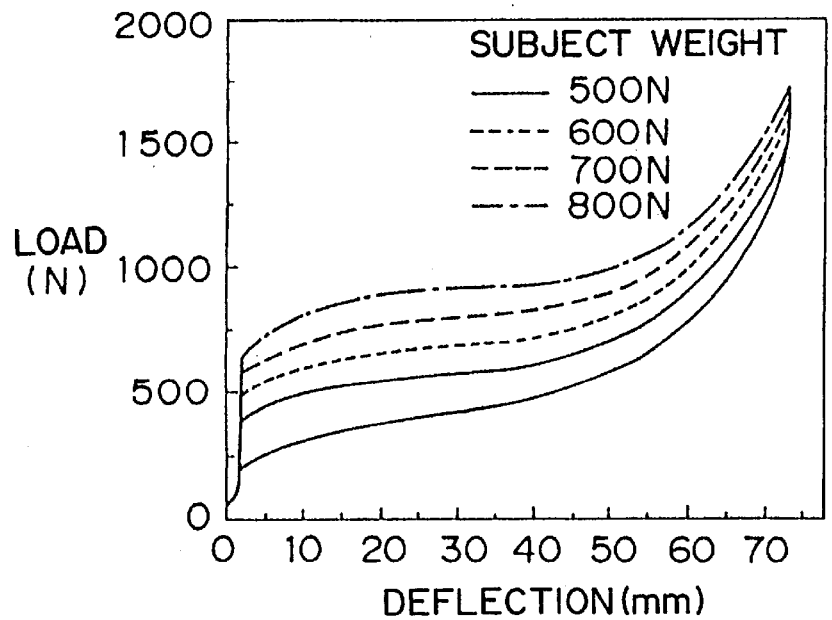
FIG. 49 is a graph showing the static characteristics of a suspension unit employing the magnetic spring.
Figure 50:
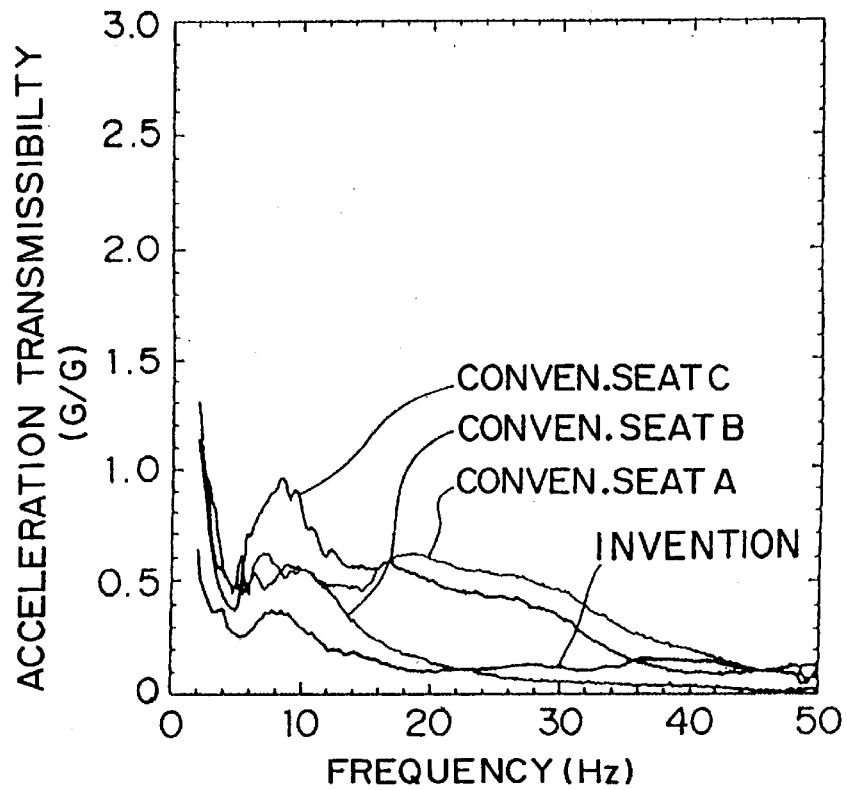
FIG. 50 is a graph showing the vibration characteristics of conventional suspension units and those of the suspension unit employing the magnetic spring.

As shown in FIG. 48, the load-deflection characteristics providing a smooth change in natural frequency can be designed using the magnetic spring characteristics exhibiting the behavior opposite to metal springs or air springs. Moreover, in a suspension unit having characteristics as shown in FIG. 49, the vibration transmissibility was found ideal, because it was kept lower than 1.0 G/G at 2–3.5 Hz and lower than 0.4 G/G at 3.5–50 Hz, as shown in FIG. 50.

From the foregoing, the following advantages can be obtained by incorporating the magnetic spring of the present invention into a suspension seat.

(1) Any functions for adjusting both the occupant's weight and the stiffness of a damper are unnecessary, when the conditions for a vibration transmissibility lower than 2.0 G/G in a low frequency region of 2–3.5 Hz are needed.

(2) The function for adjusting the occupant's weight is needed for obtaining a vibration transmissibility lower than 1.0 G/G in a low frequency region of 2–3.5 Hz.

(3) By the combination with metal springs having the function for reducing an end-stop impact, superior vibration isolation can be obtained in a high frequency region of 5–50 Hz for a LOG-SWEEP sinusoidal wave with a constant acceleration of 0.3 G.

On the other hand, an amplifier capable of producing a great output with a small input can be realized by incorporating the relationship of input and output of the negative damping characteristics into a power-doubling mechanism. In addition, active controllers employing this amplifier have the following good characteristics.

(1) Driving and moving parts are non-contact, allowing power transmission to the places divided by partitioned walls.

(2) The driving and moving parts can be placed in separate spaces, enlarging the freedom of layout.

(3) The amplifier can have a power-doubling function and both the driving and moving parts cause almost no loss, resulting in low noise and energy-saving.

(4) Even if an actuator function is turned off, the vibration isolating properties are still maintained. In other words, an actuator of a soft structure having the spring properties and the damping properties can be obtained.

Because the present invention is of the construction referred to above, it has the following effects.

The geometric dimensions between at least two opposing permanent magnets are changed by an external force on the input side and on the output side, and converted into a repulsive force within a kinetic system in which the permanent magnets are placed so that the repulsive force from a balanced position of the permanent magnets on the output side may be made greater than the repulsive force on the input side. By so doing, passive control, semi-active control, and active control can be achieved based on the same conception.

Because the maximum repulsive force is generated at the closest position of the permanent magnets or the position having passed the closest position, the magnetic field as the field of potential can be effectively utilized, making it possible to realize an inexpensive magnetic brake, dynamic damper, dynamo, amplifier or the like.

Moreover, the nonlinear vibration system or coefficient exciting vibration system according to the present invention is of the structure for converting energy into damping, continuous or diverging vibration by making use of a magnetic spring having positive, 0-, or negative damping characteristics. Accordingly, by incorporating it into a vibration isolator device for automotive seats or beds for ambulance cars, it is possible to reduce the vibration transmissibility in a high frequency region, absorb the weight difference, or reduce vibration energy in a low frequency region for the reduction of the resonant point or the like.

We claim:

1. A magnetic spring having 0- or negative damping characteristics, comprising:

a first permanent magnet having a first magnetic pole of a first polarity on a face of said first permanent magnet and a second magnetic pole of a second polarity on said face of said first permanent magnet;

a second permanent magnet having a first magnetic pole of the first polarity on a face of said second permanent magnet and a second magnetic pole of the second polarity on said face of said second permanent magnet, said first and second permanent magnets being spaced from each other and oriented such that the magnetic pole of the first polarity of said first permanent magnet is opposed to the magnetic pole of the first polarity of said second permanent magnet and such that the magnetic pole of the second polarity of said first permanent magnet is opposed to the magnetic pole of the second polarity of said second permanent magnet, said first and second permanent magnets having a variable opposing area between said faces of said first and second permanent magnets;

a kinetic mechanism operatively coupled to said first and second permanent magnets for moving one of said first and second permanent magnets relative to the other of said first and second permanent magnets so as to change the opposing area between said faces of said first and second permanent magnets via an external force applied to said kinetic mechanism at a time of input and at a time of output, and for converting the external force applied to said kinetic mechanism into a repulsive force such that the repulsive force from a balanced position of said first and second permanent magnets is made greater at the time of output than at the time of input.

2. The magnetic spring having 0- or negative damping characteristics according to claim 1, wherein a maximum repulsive force is generated at a closest position of said first and second permanent magnets or a position having passed the closest position.

3. The magnetic spring having 0- or negative damping characteristics according to claim 1, wherein the geometric dimensions are changed by changing any one of a distance between said first and second permanent magnets, an opposing area thereof, a magnetic flux density, and a magnetic field.

4. A magnetic spring having positive damping characteristics, comprising:

a first permanent magnet having a first magnetic pole of a first polarity on a face of said first permanent magnet and a second magnetic pole of a second polarity on said face of said first permanent magnet;

a second permanent magnet having a first magnetic pole of the first polarity on a face of said second permanent magnet and a second magnetic pole of the second polarity on said face of said second permanent magnet, said first and second permanent magnets being spaced from each other and oriented such that the magnetic pole of the first polarity of said first permanent magnet is opposed to the magnetic pole of the first polarity of said second permanent magnet and such that the magnetic pole of the second polarity of said first permanent magnet is opposed to the magnetic pole of the second polarity of said second permanent magnet, said first and second permanent magnets having variable geometric dimensions therebetween;

a kinetic mechanism operatively coupled to said first and second permanent magnets for moving one of said first and second permanent magnets relative to the other of said first and second permanent magnets so as to change the geometric dimensions between said first and second permanent magnets via an external force applied to said kinetic mechanism at a time of input and at a time of output to reduce a spring constant of said first and second permanent magnets so that the external force is attenuated by a phase lag caused by the external force, thereby providing nonlinear damping and spring characteristics.

5. The magnetic spring having positive damping characteristics according to claim 4, wherein a maximum repulsive force is generated at a closest position of said first and second permanent magnets.

6. The magnetic spring having positive damping characteristics according to claim 4, wherein the geometric dimensions are changed by changing any one of a distance between said first and second permanent magnets, an opposing area thereof, a magnetic flux density, and a magnetic field.

7. A coefficient exciting vibration mechanism comprising:

a first permanent magnet having a first magnetic pole of a first polarity on a face of said first permanent magnet and a second magnetic pole of a second polarity on said face of said first permanent magnet;

a second permanent magnet having a first magnetic pole of the first polarity on a face of said second permanent magnet and a second magnetic pole of the second polarity on said face of said second permanent magnet, said first and second permanent magnets being spaced from each other and oriented such that the magnetic pole of the first polarity of said first permanent magnet is opposed to the magnetic pole of the first polarity of said second permanent magnet and such that the magnetic pole of the second polarity of said first permanent magnet is opposed to the magnetic pole of the second polarity of said second permanent magnet, said first and second permanent magnets having variable geometric dimensions therebetween;

a kinetic mechanism operatively coupled to said first and second permanent magnets for moving one of said first and second permanent magnets relative to the other of said first and second permanent magnets so as to change the geometric dimensions between said first and second permanent magnets via an external force applied to said kinetic mechanism; and an inertia member coupled to one of said first and second permanent magnets operable to change the geometric dimensions between said first and second permanent magnets so as to cause a phase lag and attenuating the external force via the phase lag.

* * * * *